US011777322B2

(12) United States Patent
Chen et al.

(10) Patent No.: US 11,777,322 B2
(45) Date of Patent: Oct. 3, 2023

(54) ISLANDING DETECTION MOTHOD FOR INVERTER AND APPARATUS

(71) Applicant: Delta Electronics (Shanghai) CO., LTD, Shanghai (CN)

(72) Inventors: Li Chen, Shanghai (CN); Changyong Wang, Shanghai (CN); Aibin Qiu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 38 days.

(21) Appl. No.: 17/240,761

(22) Filed: Apr. 26, 2021

(65) Prior Publication Data

US 2021/0384735 A1 Dec. 9, 2021

(30) Foreign Application Priority Data

Jun. 3, 2020 (CN) .......................... 202010493633.6

(51) Int. Cl.
  *H02J 3/38* (2006.01)
  *G05B 13/04* (2006.01)
  *H02J 3/01* (2006.01)
  *H02M 7/5387* (2007.01)

(52) U.S. Cl.
  CPC ............ *H02J 3/388* (2020.01); *G05B 13/042* (2013.01); *H02J 3/01* (2013.01); *H02M 7/53871* (2013.01)

(58) Field of Classification Search
  None
  See application file for complete search history.

(56) References Cited

U.S. PATENT DOCUMENTS

| 6,472,775 | B1 | 10/2002 | Huang et al. | |
| 9,331,487 | B2 | 5/2016 | Yuan | |
| 2012/0007436 | A1* | 1/2012 | Yamada | H02J 3/381 |
| | | | | 307/86 |

(Continued)

FOREIGN PATENT DOCUMENTS

| CN | 102664413 A | 9/2012 |
| CN | 101741101 B | 11/2012 |

(Continued)

OTHER PUBLICATIONS

Liu Jia et al: "Model-predictive-control-based distributed control scheme for bus voltage unbalance and harmonics compensation in microgrids",Oct. 1, 2017.

(Continued)

*Primary Examiner* — Mohammad Ali
*Assistant Examiner* — David Earl Ogg
(74) *Attorney, Agent, or Firm* — Qinghong Xu

(57) ABSTRACT

The present disclosure provides an islanding detection method for an inverter and a corresponding apparatus. The islanding detection method includes: step A1: obtaining a parameter of an output voltage of a three-phase AC system and a steady-state value corresponding to the parameter within a period of time; step A2: obtaining a disturbance signal based on the parameter and the steady-state value; step A3: superimposing the disturbance signal on at least one reference value of a droop control; and step A4: detecting the parameter added with the disturbance signal, and determining that island occurs in response to the parameter greater than an upper limit or less than a lower limit.

15 Claims, 21 Drawing Sheets

(56) References Cited

U.S. PATENT DOCUMENTS

| | | | | |
|---|---|---|---|---|
| 2013/0051103 A1* | 2/2013 | Roscoe | ............. | H02M 7/53875 |
| | | | | 363/131 |
| 2014/0191699 A1 | 7/2014 | Dixon | | |
| 2017/0155247 A1* | 6/2017 | Liu | ............ | H02J 3/18 |
| 2019/0178923 A1* | 6/2019 | Shao | ............ | H02J 3/38 |

FOREIGN PATENT DOCUMENTS

| | | | | | |
|---|---|---|---|---|---|
| CN | 105470995 | A | | 4/2016 | |
| CN | 107681688 | A | | 2/2018 | |
| CN | 107947240 | A | * | 4/2018 | |
| CN | 108808704 | A | * | 11/2018 | ............... H02J 3/01 |
| CN | 109193746 | A | | 1/2019 | |
| CN | 109888829 | A | | 6/2019 | |
| CN | 109980682 | A | * | 7/2019 | |
| CN | 110336319 | A | | 10/2019 | |
| CN | 110994743 | A | | 4/2020 | |
| JP | 2013085435 | A | | 5/2013 | |
| JP | 2014217140 | A | | 11/2014 | |
| TW | 200726024 | A | | 7/2007 | |
| TW | 201830827 | A | | 8/2018 | |

OTHER PUBLICATIONS

Qu Zisen et al: "Application of virtual synchronous generator technology in three-phase four-leg inverter", Aug. 11, 2017.

The Extended European Search Report dated Oct. 15, 2021 for EP patent application No. 21171786.3.

Notice of Allowance dated May 23, 2022 of Japan Paten Application No. 2021-070275.

The 1st Office Action dated Mar. 24, 2022 for TW patent application No. 110114597.

The Notice of Allowance dated Feb. 8, 2022 for TW patent application No. 110114596.

Non-Final Rejection dated Aug. 4, 2023 of U.S. Appl. No. 17/237,409.

* cited by examiner

ISLANDING DETECTION MOTHOD FOR INVERTER AND APPARATUS

CROSS-REFERENCE TO RELATED APPLICATIONS

This application is based upon and claims priority to Chinese Patent Application No. 202010493633.6, filed on Jun. 3, 2020, the entire content of which is herein incorporated by reference for all purpose.

TECHNICAL FIELD

The present invention relates to the technical field of power electronics, in particular to an islanding detection method for an inverter and a corresponding apparatus.

BACKGROUND

At present, a lame number of grid-connected inverters adopting power electronic equipment have been put into the power grid. The dynamic response of the inverter is fast but the moment of inertia is small, which is not conducive to the stability of the power grid.

Synchronous generators can maintain the stability of voltage and frequency of the power grid. Grid-connected inverters having performance of a virtual synchronous generator (VSG) can simulate the inertia and damping characteristics of synchronous generators, provide transient power support during load sudden changes, and maintain frequency stability of the power grid. When controlling the amplitude and frequency of the output voltage of the virtual synchronous generator, it is necessary to distinguish between the different operating states of grid-connected operation and off-grid operation, so as to perform a targeted control. The existing islanding detection injects a reactive current by detecting the frequency of the power grid, but there is no current loop in virtual synchronous generator control, so the existing method is not suitable for the virtual synchronous generator control. Therefore, there is a need for an islanding detection method suitable for the virtual synchronous generator control, which can quickly and accurately identify an islanding phenomenon without affecting the stability and reliability of the system.

It should be noted that the information disclosed in the above Background section is only used to enhance the understanding of the background of the present utility model, and therefore may include information that does not constitute the prior art known to those of ordinary skill in the art.

SUMMARY

An objective of the present invention is to provide an islanding detection method for an inverter and a corresponding apparatus, so as to overcome at least to a certain extent one or more problems caused by the limitations and defects of related technologies.

According to a first aspect of the present invention, there is provided an islanding detection method for an inverter. The islanding detection method for an inverter may include: a step A1: obtaining a parameter of an output voltage of a three-phase alternating current (AC) system and a steady-state value corresponding to the parameter within a period of time; a step A2: obtaining a disturbance signal based on the parameter and the steady-state value; a step A3: superimposing the disturbance signal on at least one reference value of a droop control; and a step A4: detecting the parameter added with the disturbance signal, and determining that island occurs in response to the parameter greater than an upper limit or less than a lower limit.

In some embodiments, the step A2 includes: a step A21: comparing the steady-state value with the parameter; a step A22: obtaining a new parameter by superimposing an increment to the parameter when the steady-state value is not equal to the parameter; and a step A23: calculating an error between the steady-state value and the new parameter, and obtaining the disturbance signal by reversing the error.

In some embodiments, when the steady-state value is greater than the parameter, superimpose a reverse disturbance on the at least one reference value of the droop control; and when the parameter added with the reverse disturbance is less than the lower limit, determine that the island occurs.

In some embodiments, when the steady-state value is less than the parameter, superimpose a forward disturbance on the at least one reference value of the droop control; and when the parameter added with the forward disturbance is greater than the upper limit, determine that the island occurs.

In some embodiments, before the step A1, the method further includes: obtaining the parameter by phase-locking the output voltage of the three-phase AC system; and obtaining the steady-state value by filtering the parameter for the period of time.

In some embodiments, the method further includes performing a virtual synchronous generator control on the inverter. The virtual synchronous generator control includes the droop control. When the parameter is a voltage amplitude, superimpose the disturbance signal on a voltage amplitude reference value of the droop control; and when the parameter is an angular frequency, superimpose the disturbance signal on an angular frequency reference value of the droop control.

In some embodiments, when the parameter is the voltage amplitude, the step A4 may include: detecting the voltage amplitude added with the disturbance signal, and determining that the island occurs in response to the voltage amplitude greater than the upper limit or less than the lower limit.

In some embodiments, when the parameter is the angular frequency, the step A4 may include: detecting the angular frequency added with the disturbance signal, and determining that the island occurs in response to the angular frequency greater than the upper limit or less than the lower limit.

According to a second aspect of the present disclosure, there is provided an islanding detection apparatus for an inverter. The islanding detection apparatus for the inverter may include a parameter obtaining module, an disturbance signal obtaining module, an disturbance signal introduction module and a determination module. The parameter obtaining module is configured to obtain a parameter of an output voltage of a three-phase alternating current (AC) system and a steady-state value corresponding to the parameter within a period of time. The disturbance signal obtaining module is configured to obtain a disturbance signal based on the parameter and the steady-state value. The disturbance signal introduction module is configured to superimpose the disturbance signal on at least one reference value of a droop control. The determination module is configured to detect the parameter added with the disturbance signal, and determine that island occurs in response to the parameter greater than an upper limit or less than a lower limit.

In some embodiments, the disturbance signal obtaining module may include a comparison sub-module, a superposition sub-module and a calculation sub-module. The comparison sub-module is configured to compare the steady-state value with the parameter. The superposition sub-module is configured to obtain a new parameter by superimposing an increment to the parameter when the steady-state value is not equal to the parameter. The calculation sub-module is configured to calculate an error between the steady-state value and the new parameter, and obtain the disturbance signal by reversing the error.

According to a third aspect of the present disclosure, there is provided an electronic device. The electronic device may include a processor and a memory for storing instructions executable by the processor: The processor is configured to: obtain a parameter of an output voltage of a three-phase alternating current (AC) system and a steady-state value corresponding to the parameter within a period of time; obtain an disturbance signal based on the parameter and the steady-state value; superimpose the disturbance signal on at least one reference value of a droop control; and detect the parameter added with the disturbance signal, and determine that island occurs in response to the parameter greater than an upper limit or less than a lower limit.

According to a fourth aspect of the present disclosure, there is provided a computer-readable storage medium having a computer program stored thereon. When the computer program is executed, steps in an islanding detection method for an inverter are performed, the method may include a step A1: obtaining a parameter of an output voltage of a three-phase alternating current (AC) system and a steady-state value corresponding to the parameter within a period of time; a step A1 obtaining an disturbance signal based on the parameter and the steady-state value; a step A3: superimposing the disturbance signal on at least one reference value of a droop control; and a step A4: detecting the parameter added with the disturbance signal, and determining that island occurs in response to the parameter greater than an upper limit or less than a lower limit.

It should be understood that the above general description and the following detailed description are only exemplary and explanatory, and cannot limit the disclosure.

BRIEF DESCRIPTION OF THE DRAWINGS

The drawings herein are incorporated into and constitute a part of the specification. The drawings show embodiments consistent with the present disclosure, and are used to explain the principles of the disclosure together with the specification. Obviously, the drawings in the following description are only some embodiments of the present disclosure. For those of ordinary skill in the art, without paying any creative work, other drawings can be obtained based on these drawings.

FIG. 5b schematically shows a schematic diagram of a control architecture corresponding to the control process in FIG. 5a;

FIG. 7b schematically shows a schematic diagram of a control architecture corresponding to the control process in FIG. 7a;

FIG. 8b schematically shows a schematic diagram of a control architecture corresponding to the control process in FIG. 8a;

DETAILED DESCRIPTION

Figure 1:
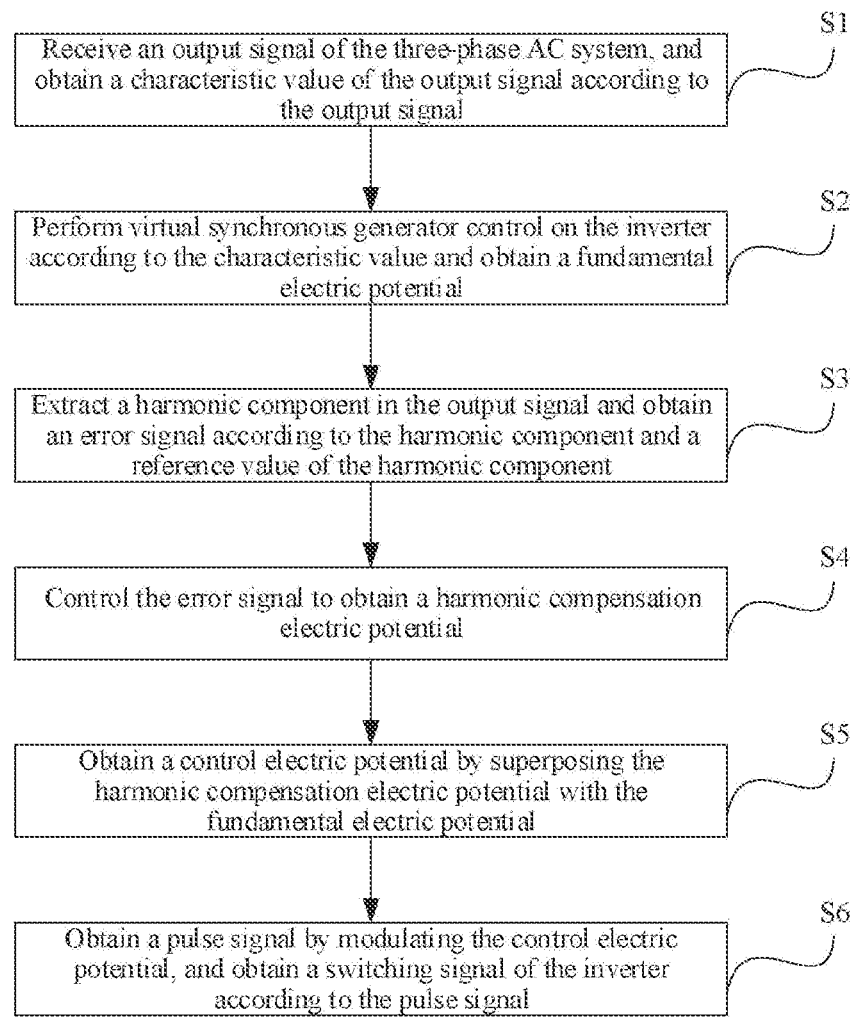
FIG. 1 schematically shows a flow chart of a control method of a three-phase alternating current (AC) system according to an embodiment of the present disclosure.

Exemplary embodiments will now be described more fully with reference to the drawings. However, the exemplary embodiments can be implemented in various forms, and should not be construed as being limited to the examples set forth herein; on the contrary, providing these embodiments makes the disclosure more comprehensive and complete, and fully conveys the concept of the exemplary embodiments to those skilled in the art.

In addition, the features, structures, or characteristics described may be combined in one or more embodiments in any suitable manner. In the description below, numerous specific details are set forth to provide a thorough understanding of the embodiments of the present disclosure. However, those skilled in the art will appreciate that the technical solution of the present disclosure may be practiced without one or more of the specific details, or other methods, components, apparatus, steps and the like may be employed. In other instances, well-known methods, apparatus, implements or operations are not shown or described in detail to avoid obscuring various aspects of the present disclosure.

The block diagrams shown in the drawings are merely functional entities, and do not necessarily correspond to physically independent entities. That is, these functional entities can be implemented in the form of software, or implemented in one or more hardware modules or integrated circuits, or implemented in different networks and/or processor devices and/or microcontroller devices.

The flowcharts shown in the drawings are only illustrative, and do not necessarily include all contents and operations/steps, nor do they have to be performed in the described order. For example, some operations/steps can also be decomposed, and some operations/steps can be combined or partially combined, and the actual performing order may be changed according to actual conditions.

The present disclosure provides a control method and device for a three-phase Alternating Current (AC) system to realize harmonic suppression of the three-phase AC system under control of a virtual synchronous generator and to ensure that output power quality meets the standard.

The three-phase AC system includes a control device, an inverter, and a filter unit. The control device is electrically connected to the inverter, and the inverter is coupled to a grid and a load through the filter unit. The control device controls switching operations of the inverter to regulate an output signal of the three-phase system. FIG. 1 is a flow chart of a control method performed by the control device. As shown in FIG. 1, the control method includes:

step S1, receiving an output signal of the three-phase AC system, and obtaining a characteristic value of the output signal according to the output signal;

step S2, performing virtual synchronous generator control on the inverter according to the characteristic value to obtain a fundamental electric potential;

step S3, extracting a harmonic component in the output signal, and obtaining an error signal according to the harmonic component and a reference value of the harmonic component;

step S4, controlling the error signal to obtain a harmonic compensation electric potential;

step S5, obtaining a control electric potential by superimposing the harmonic compensation electric potential with the fundamental electric potential; and step S6, obtaining a pulse signal by modulating the control electric potential, and obtaining a switching signal of the inverter according to the pulse signal.

Figure 2:
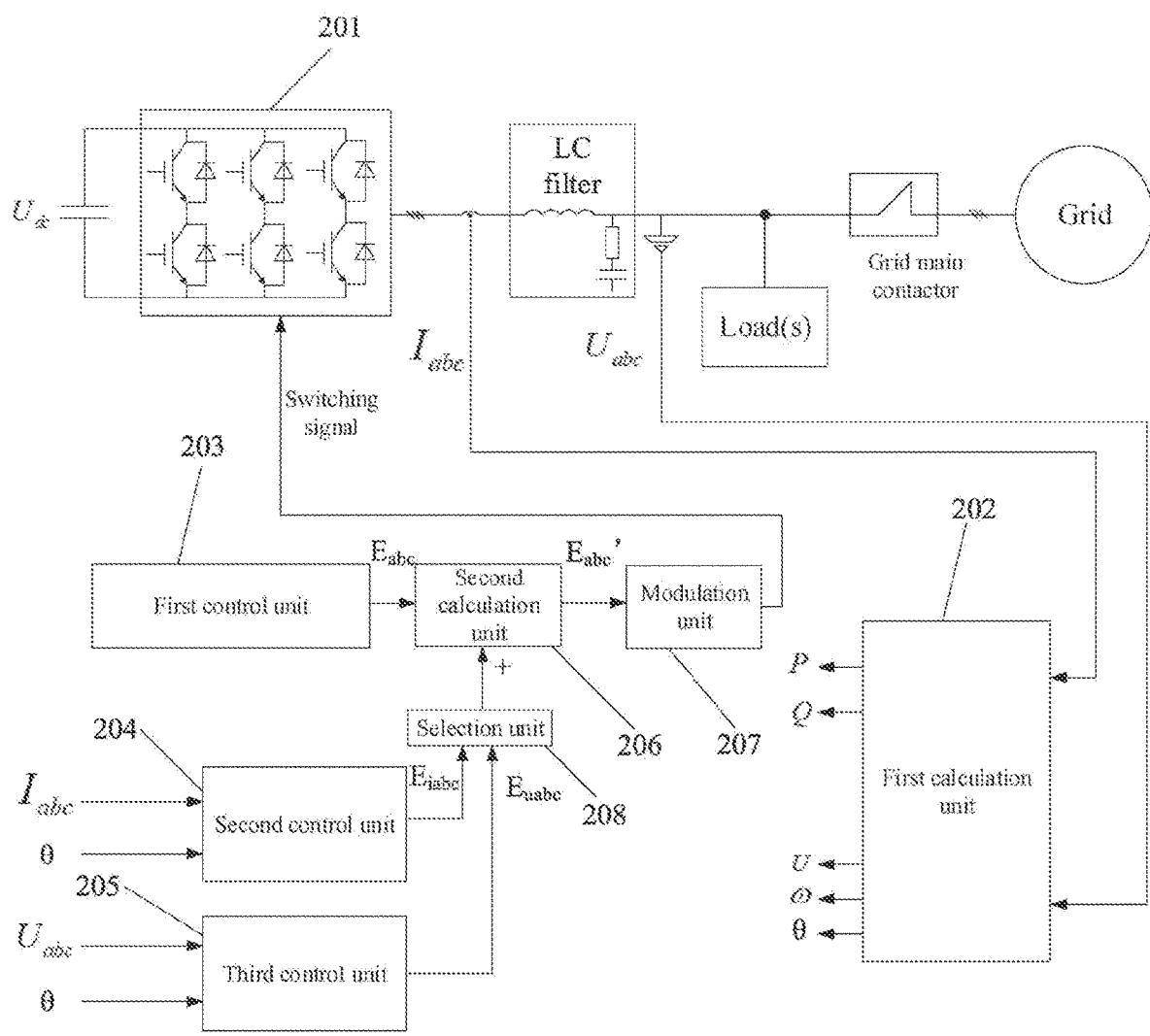
FIG. 2 schematically shows a schematic diagram of a three-phase AC system according to an embodiment of the present disclosure.

The virtual synchronous generator control is performed on the inverter to obtain a fundamental electric potential. And a harmonic component including a fundamental negative sequence component in the output signal is extracted, and a difference between the harmonic component and zero is obtained as an error signal. Closed-loop control is performed on the error signal to obtain a harmonic compensation electric potential, and the fundamental electric potential and the harmonic compensation electric potential are added up to obtain a control electric potential. The control electric potential is modulated by Space Vector Pulse Width Modulation (SVPWM) or Sine Pulse Width Modulation (SPWM) to obtain a switching signal to control the switching operations of the inverter. In the technical solution of this embodiment, the virtual synchronous generator control is performed on the inverter, so that the inverter can simulate the inertia and damping characteristics of a synchronous motor to maintain the stability of the grid voltage and frequency; and harmonic adjustment is added to suppress the harmonic components in the output signal of the three-phase AC system, FIG. 2 is a schematic diagram of the three-phase AC system. As shown in FIG. 2, the three-phase AC system is coupled to the grid through a main contactor, and the three-phase AC system is also electrically connected to a load. The three-phase system includes an inverter 201, an LC filter, and a control device. The control device samples an output current $I_{abc}$, of the inverter and an output voltage $U_{abc}$ of the three-phase AC system and outputs a switching signal to control the switching operations of the inverter. The control device includes a first calculation unit 202, a first control unit 203, a regulation unit, a second calculation unit 206, and a modulation unit 207.

The first calculation unit 202 samples the output signals of the three-phase AC system. For example, the first calculation unit 202 samples the output current $I_{abc}$ of the inverter 201 and the output voltage $U_{abc}$ of the three-phase AC system to output active power P and reactive power Q of the inverter, an amplitude U and angular frequency ω of the output voltage $U_{abc}$, and an angular signal θ. The first control unit 203 performs virtual synchronous generator (VSG) control on the inverter to obtain the fundamental electric potential $E_{abc}$. The regulation unit includes a second control unit 204 and a third control unit 205. The second control unit 204 receives the output current $I_{abc}$ and the angle signal θ of the inverter and outputs a harmonic compensation electric potential $E_{iabc}$ to suppress the harmonic current in the output current of the inverter. The harmonic current includes the fundamental negative sequence current. The third control unit 205 receives the output voltage $U_{abc}$ and the angle signal θ of the three-phase AC system and outputs the harmonic compensation electric potential $E_{uabc}$ to suppress the harmonic voltage in the output voltage of the three-phase AC system. The harmonic voltage includes the fundamental negative sequence voltage.

The control device further includes a selection unit 208. According to an operation mode of the three-phase AC system, the selection unit 208 selects to perform harmonic current control and output a harmonic compensation electric potential $E_{iabc}$, or to perform harmonic voltage control and output a harmonic compensation electric potential $E_{uabc}$. Specifically, when the three-phase AC system is operating in a grid-connected mode, the selection unit switches to the second control unit 204 and outputs the harmonic compensation electric potential $E_{iabc}$ to suppress the harmonic current. When the three-phase AC system is operating in an off-grid mode, with asymmetric or nonlinear loads, the selection unit switches to the third control unit 205, and outputs the harmonic compensation electric potential $E_{uabc}$ to suppress the harmonic voltage. The second calculation unit 206 is an adder, which adds up the harmonic compensation electric potential and the fundamental electric potential to obtain the control electric potential $E_{abc}'$. The modulation unit 207 modulates the control electric potential $E_{abc}'$ to obtain a pulse signal, and obtains the switching signal of the inverter according to the pulse signal. The modulation method can be SVPWM, SPWM, or the like.

For the three-phase AC system based on the virtual synchronous generator control, the harmonic current is extracted during the grid-connected operation, and the closed-loop control of the harmonic current is performed to ensure that the output current quality meets the standard, and the output voltage is clamped by the grid voltage. During the off-grid operation with asymmetric and non-linear loads, the harmonic voltage is extracted, and the closed-loop control of the harmonic voltage is performed to ensure that the output voltage quality meets the standard. The three-phase AC system and the control method thereof proposed by the present disclosure can simultaneously realize the performance of the virtual synchronous generator itself and the control performance of grid-connected and off-grid operations.

Figure 3:
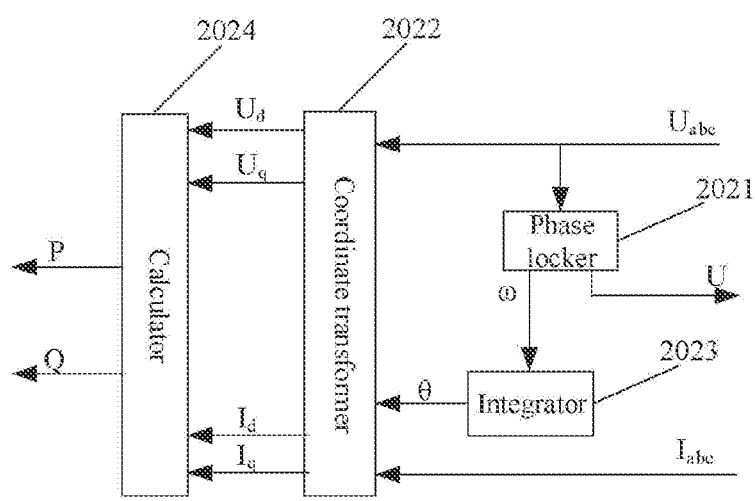
FIG. 3 schematically shows a block diagram of a first calculation unit according to an embodiment of the present disclosure.

FIG. 3 is an exemplary schematic diagram of the first calculation unit 202 in FIG. 2. As shown in FIG. 3, the first calculation unit 202 includes a phase locker 2021, a coordinate transformer 2022, an integrator 2023, and a calculator 2024. The first calculation unit samples the output current $I_{abc}$ and the output voltage $U_{abc}$. The phase locker 2021 phase-locks the output voltage $U_{abc}$ to obtain an amplitude U and angular frequency ω thereof. The integrator 2023 integrates the angular frequency ω to obtain an angle signal θ. The coordinate transformer 2022 performs two-phase rotating/three-phase stationary (2r/3s) coordinate transformation on the output current $I_{abc}$ and the output voltage $U_{abc}$ according to the angle signal θ, respectively, to obtain a d-axis voltage $U_d$, a q-axis voltage $U_q$, a d-axis current $I_d$ and a q-axis current $I_q$. The calculator 2024 calculates the active power P and the reactive power Q of the three-phase AC system according to the d-axis voltage $U_d$, the q-axis voltage $U_q$, the d-axis current $I_d$, and the q-axis current $I_q$.

Figure 4:
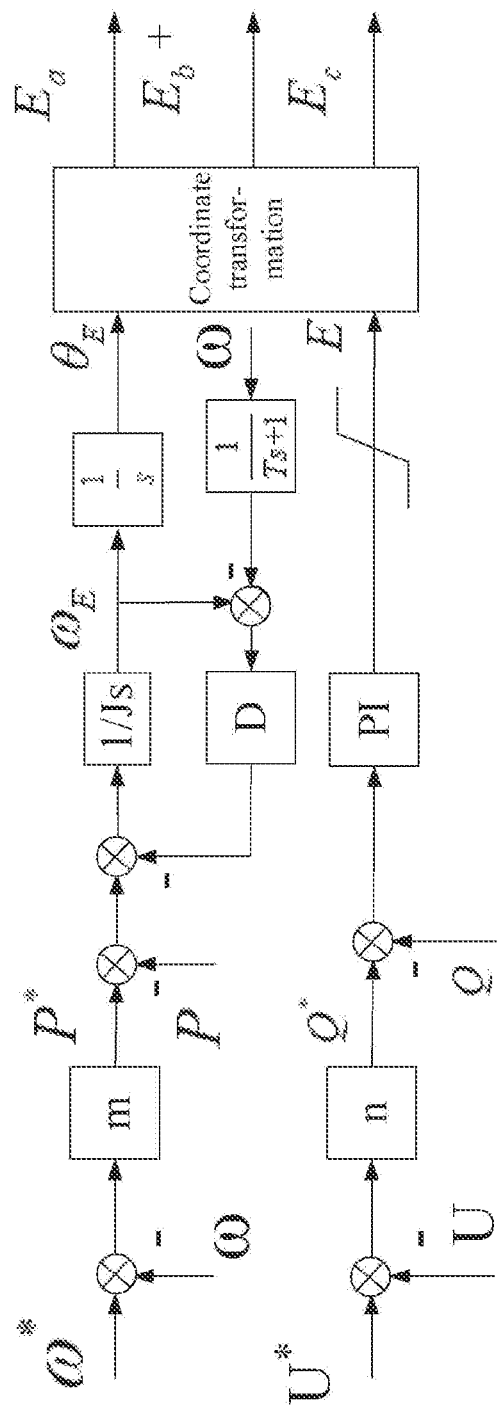
FIG. 4 schematically shows a block diagram of a first control unit according to an embodiment of the present disclosure.

FIG. 4 is a control block diagram corresponding to the first control unit 203 in FIG. 2, that is, a block diagram of virtual synchronous generator control. As shown in FIG. 4, the first control unit performs the virtual synchronous generator control of the inverter. According to power-angle characteristics, the first control unit performs droop control on the amplitude U and angular frequency co of the output voltage to obtain a reactive power reference value Q* and an active power reference value P*. The calculated active power P and reactive power Q are used as power feedback for VSG control. Inertia and damping control is performed to regulate the active power, thereby obtaining an output angular frequency $ω_E$, and integrate the angular frequency is integrated to obtain the angle signal $θ_E$. PI closed-loop control is performed to regulate the reactive power, thereby outputting an electric potential amplitude E. And a three-phase AC electric potential $E_{abc}$ is obtained according to the electric potential amplitude E and angle signal $θ_E$. $E_{abc}$ is a fundamental positive sequence output electric potential, also referred to as a fundamental electric potential for short.

When the three-phase AC system is operating in the grid-connected mode, the harmonic current in the output current of the inverter is controlled. Therefore, in step S3, the output signal corresponds to the output current, and the harmonic component corresponds to the harmonic current. The harmonic current in the output current of the inverter 201 is extracted, the error signal of the harmonic current is obtained according to the harmonic current reference value, and the error signal is adjusted to obtain the harmonic compensation electric potential.

Figure 5A:
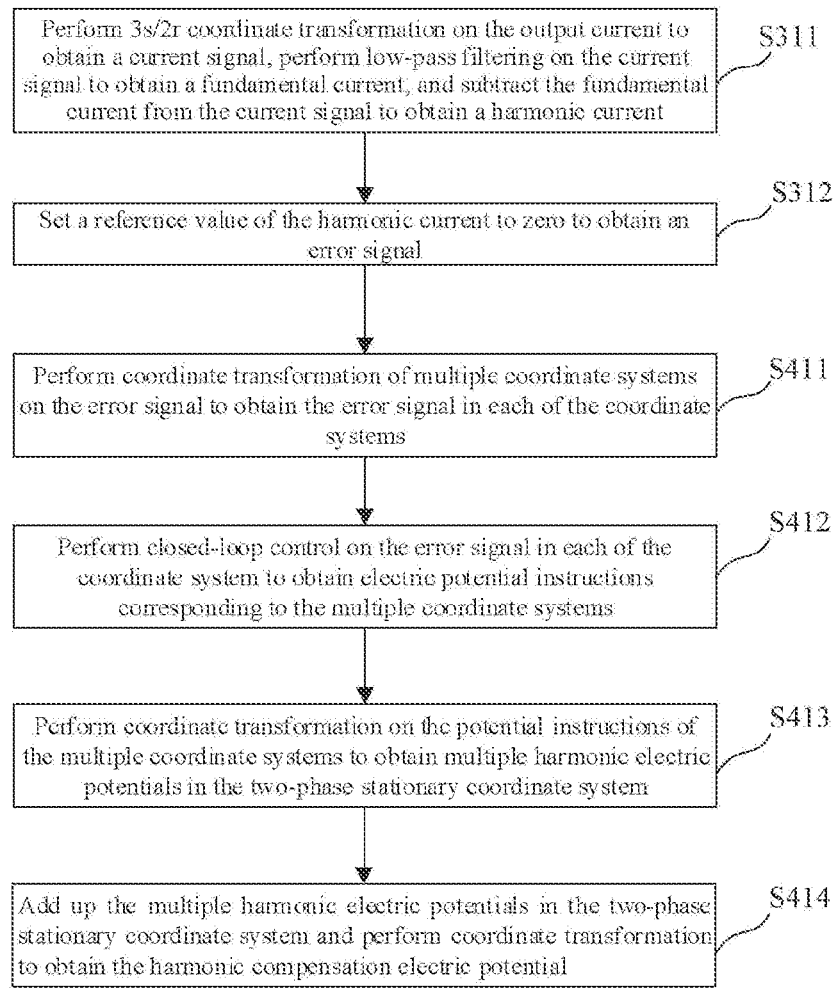
FIG. 5a schematically shows a flow chart of controlling a harmonic current according to an embodiment of the present disclosure.
Figure 5B:
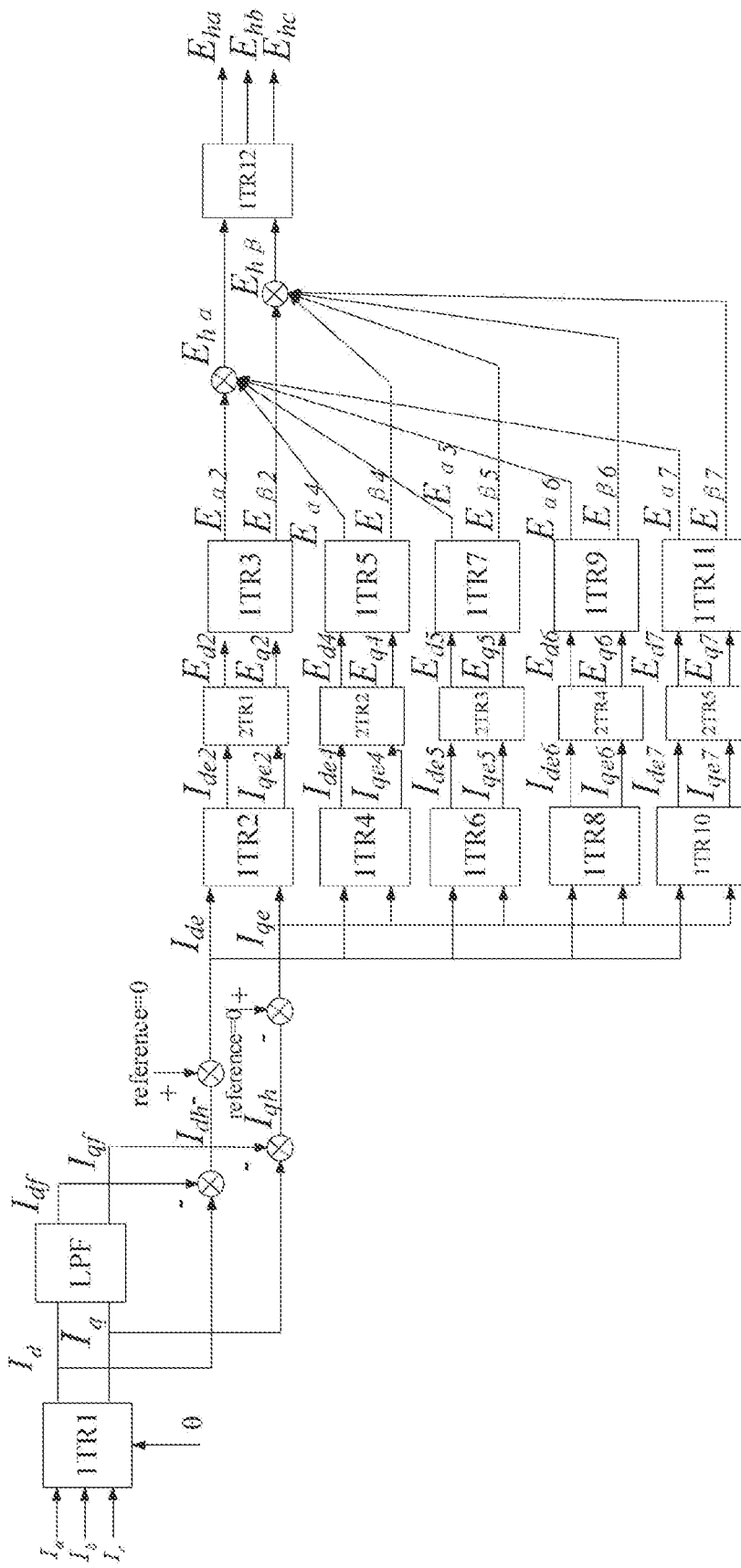

FIG. 5a is a flow chart of control steps for harmonic current in the grid-connected mode, and FIG. 5b is a control architecture corresponding to the control process of FIG. 5a. Specifically, as shown in FIG. 5a, step S3 may include the following sub-steps:

step S311, performing three-phase stationary/two-phase rotating (3s/2r) coordinate transformation on the output current $I_{abc}$ to obtain a current signal, performing low-pass filtering on the current signal to obtain a fundamental current, and subtracting the fundamental current from the current signal to obtain a harmonic current, where the current signal is essentially the d-axis current $I_d$ and the q-axis current $I_q$ of the output current in a dq coordinate system; and step S312, setting a reference value of the harmonic current to zero to obtain an error signal, where the error signal is essentially a difference between the harmonic current and zero, that is, the error signal is obtained by subtracting the harmonic current from zero.

Step S4 may include the following sub-steps:

step S411, performing coordinate transformation of multiple coordinate systems on the error signal to obtain the error signal in each of the coordinate systems. For example, Park transformation of multiple coordinate systems is performed on the error signal to obtain the error signals in the multiple coordinate systems;

step S412, performing closed-loop control on the error signal in each of the coordinate systems to obtain electric potential instructions corresponding to the multiple coordinate systems;

step S413, performing coordinate transformation on the electric potential instructions of the multiple coordinate systems to obtain multiple harmonic electric potentials in the two-phase stationary coordinate system. For example, Inpark transformation is performed on the electric potential instructions of multiple coordinate systems to obtain multiple harmonic electric potentials in the two-phase stationary coordinate system, where the angular frequencies of the multiple harmonic electric potentials are different; and step S414, adding up the multiple harmonic electric potentials of the two-phase stationary coordinate system and then performing two-phase stationary/three-phase stationary (2s/3s) coordinate transformation to obtain the harmonic compensation electric potential.

Referring to FIGS. 5a and 5b, coordinate transformers 1TR1 to 1TR12, a low-pass filter LPF, and current regulators 2TR1 to 2TR5 are included. The coordinate transformer 1TR1 receives the output current $I_{abc}$ and the angle signal θ, and transforms, according to the angle signal θ, the output current $I_{abc}$ from the three-phase stationary coordinate system abc to the two-phase rotating coordinate system dq (3s/2r coordinate transformation) to obtain a d-axis current signal $I_d$ and a q-axis current signal $I_q$. In another embodiment, the coordinate transformer 1TR1 receives the output current $I_{abc}$ and the angle signal θ, and according to the angle signal θ, first transforms the output current $I_{abc}$ from the three-phase stationary coordinate system abc to a two-phase stationary coordinate system αβ (3s/2s coordinate transformation), and then transforms it from the two-phase stationary coordinate system αβ to the two-phase rotating coordinate system dq (2s/2r coordinate transformation). The first-order low-pass filter LPF performs filtering on $I_d$ and $I_q$ to extract fundamental currents $I_{df}$ and $I_{qf}$, and the fundamental currents $I_{df}$ and $I_{qf}$ are subtracted from the total current signals $I_d$ and $I_q$ to obtain harmonic currents $I_{dh}$ and $I_{qh}$. The reference value of the harmonic current is 0, the feedback value of the harmonic current is $I_{dh}$ and $I_{qh}$, and the error signals $I_{de}$ and $I_{qe}$ are obtained.

The coordinate transformer 1TR2 transforms the harmonic current error signals $I_{de}$ and $I_{qe}$ from a positive sequence rotating coordinate system to a negative sequence rotating coordinate system according to the angle −2θ to obtain d-axis and q-axis components $I_{de2}$ and $I_{qe2}$ of the error signal in the negative sequence coordinate system. The current regulator 2TR1 can be a proportional-integral regulator. The current regulator 2TR1 performs proportional-integral (PI) closed-loop regulation on the d-axis and q-axis components $I_{de2}$ and $I_{qe2}$ to obtain the electric potential instructions $E_{d2}$ and $E_{q2}$ in the negative sequence coordinate system. The coordinate transformer 1TR3 transforms the negative sequence electric potential instructions $E_{d2}$ and $E_{q2}$ from the negative sequence rotating coordinate system to the two-phase stationary coordinate system according to the angle $-\theta$ to obtain the negative sequence electric potentials $E_{\alpha2}$ and $E_{\beta2}$ in the two-phase stationary coordinate system. It should be noted that in the present disclosure, it needs to suppress the negative sequence component in the output current, that is, the harmonic control includes the control on the negative sequence component. The actual frequency of the negative sequence component is also $\omega$, for example, 50 HZ, which is the fundamental negative sequence component.

The coordinate transformer 1TR4 transforms the harmonic current error signals $I_{de}$ and $I_{qe}$ from the positive sequence rotating coordinate system to a positive sequence $5^{th}$-order rotating coordinate system according to the angle $4\theta$, and the d-axis and q-axis components $I_{de4}$ and $I_{qe4}$ of the harmonic current error signals in the positive sequence $5^{th}$-order coordinate system are obtained. The current regulator 2TR2 can be an integral regulator. The current regulator 2TR2 performs integral (I) closed-loop regulation on the d-axis and q-axis components $I_{de4}$ and $I_{qe4}$ to obtain electric potential instructions $E_{d4}$ and $E_{q4}$ in the positive sequence $5^{th}$-order coordinate system. The coordinate transformer 1TR5 transforms the positive sequence $5^{th}$-order electric potential instructions $E_{d4}$ and $E_{q4}$ from the positive sequence $5^{th}$-order rotating coordinate system to the two-phase stationary coordinate system according to the angle $5\theta$, and the positive sequence $5^{th}$-order harmonic electric potentials $E_{\alpha4}$ and $E_{\beta4}$ in the two-phase stationary coordinate system are obtained.

The coordinate transformer 1TR6 transforms the harmonic current error signals $I_{dc}$ and $I_{qe}$ from the positive sequence rotating coordinate system to a negative sequence 5th-order rotating coordinate system according to the angle $-6\theta$, and the d-axis and q-axis components $I_{de5}$ and $I_{qe5}$ of the error signals in the negative sequence 5th-order coordinate system are obtained. The current regulator 2TR3 can be an integral regulator. The current regulator 2TR3 performs integral (I) closed-loop regulation on the d-axis and q-axis components $I_{de5}$ and $I_{qe5}$ to obtain the electric potential instructions $E_{d5}$ and $E_{q5}$ in the negative sequence 5th-order coordinate system. The coordinate transformer 1TR7 transforms the negative sequence 5th-order electric potential instructions $E_{d5}$ and $E_{q5}$ from the negative sequence 5th-order rotating coordinate system to the two-phase stationary coordinate system according to the angle $-5\theta$, and the negative sequence 5th-order harmonic electric potential $E_{\alpha5}$ and $E_{\beta5}$ in the two-phase stationary coordinate system are obtained.

The coordinate transformer 1TR8 transforms the harmonic current error signals $I_{de}$ and $I_{qe}$ from the positive sequence rotating coordinate system to a positive sequence 7th-order rotating coordinate system according to the angle $6\theta$, and the d-axis and q-axis components $I_{de6}$ and $I_{qe6}$ of the error signals in the positive sequence 7th-order coordinate system are obtained. The current regulator 2TR4 can be an integral regulator. The current regulator 2TR4 performs integral (I) closed-loop regulation on the d-axis and q-axis components $I_{de6}$ and $I_{qe6}$ to obtain the electric potential instructions $E_{d6}$ and $E_{q6}$ in the positive sequence 7th-order coordinate system. The coordinate transformer 1TR9 transforms the positive sequence 7th-order electric potential instructions $E_{d6}$ and $E_{q6}$ from the positive sequence 7th-order rotating coordinate system to the two-phase stationary coordinate system according to the angle $7\theta$, and the positive sequence 7th-order harmonic electric potential $E_{\alpha6}$ and $E_{\beta6}$ in the two-phase stationary coordinate system are obtained.

The coordinate transformer 1TR10 transforms the harmonic current error signals $I_{de}$ and $I_{qe}$ from the positive sequence rotating coordinate system to a negative sequence 7th-order rotating coordinate system according to the angle $-8\theta$, and the d-axis and q-axis components $I_{de7}$ and $I_{qe7}$ of the error signals in the negative sequence 7th-order coordinate system are obtained. The current regulator 2TR5 can be an integral regulator. The current regulator 2TR5 performs integral (I) closed-loop regulation on the d-axis and q-axis components $I_{de7}$ and $I_{qe7}$ to obtain the electric potential instructions $E_{d7}$ and $E_{q7}$ in the negative sequence 7th-order coordinate system. The coordinate transformer 1TR11 transforms the negative sequence 7th-order electric potential instructions $E_{d7}$ and $E_{q7}$ from the negative sequence 7th-order rotating coordinate system to the two-phase stationary coordinate system according to the angle $-7\theta$, and the negative sequence 7th-order harmonic electric potential $E_{\alpha7}$ and $E_{\beta7}$ in the two-phase stationary coordinate system are obtained.

The negative sequence electric potentials and the harmonic electric potentials of each order are added up to obtain a total harmonic electric potential $E_{h\alpha}$ and $E_{h\beta}$ in the two-phase stationary coordinate system. The coordinate transformer 1TR12 transforms the harmonic electric potentials $E_{h\alpha}$ and $E_{h\beta}$ in the two-phase stationary coordinate system from the two-phase stationary coordinate system to the three-phase stationary coordinate system to obtain the harmonic compensation electric potential $E_{habc}$. The harmonic compensation electric potential $E_{habc}$ is added to the fundamental electric potential $E_{abc}$ to obtain the control electric potential.

Figure 6:
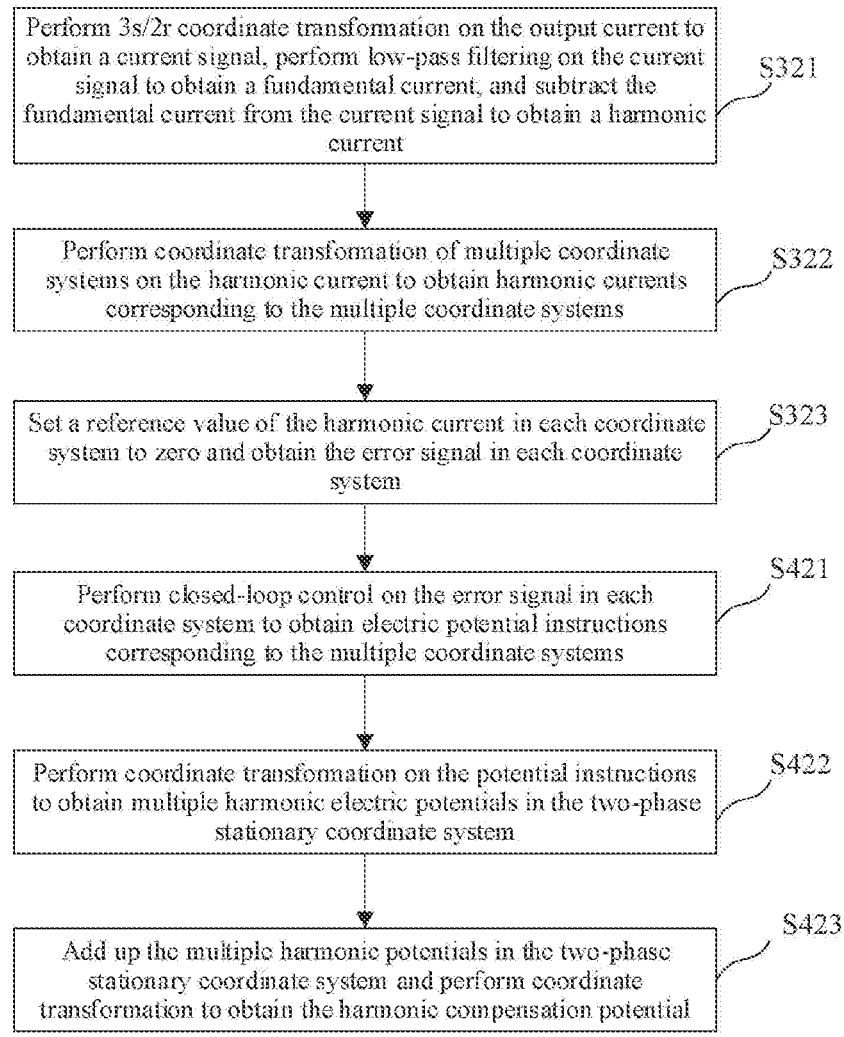
FIG. 6 schematically shows a flow chart of controlling a harmonic current according to another embodiment of the present disclosure.

FIG. 6 is a flow chart of another control step of the harmonic current in the grid-connected mode. Specifically, as shown in FIG. 6, step S3 may include the following sub-steps:

step S321, performing three-phase stationary/two-phase rotating (3s/2r) coordinate transformation on the output current to obtain a current signal, performing low-pass filtering on the current signal to obtain a fundamental current, and subtracting the fundamental current from the current signal to obtain a harmonic current. The current signal is essentially the d-axis current $I_d$ and the q-axis current $I_q$ of the output current in the dq coordinate system;

step S322, performing coordinate transformation of multiple coordinate systems on the harmonic current to obtain harmonic currents corresponding to the multiple coordinate systems. For example, the harmonic current is subjected to Park transformation of multiple coordinate systems to obtain the harmonic currents in the multiple coordinate systems; and step S323, setting a reference value of the harmonic current in each of the coordinate systems to zero, and obtaining the error signal in each of the coordinate systems. The error signal in each of the coordinate systems is essentially a difference between the harmonic current and zero in each coordinate system, that is, the error signal is obtained by subtracting the harmonic current from zero.

Step S4 may include the following sub-steps:

step S421, performing closed-loop control on the error signal in each of the coordinate systems to obtain electric potential instructions corresponding to the multiple coordinate systems;

step S422, performing coordinate transformation on the electric potential instructions to obtain multiple harmonic electric potentials in the two-phase stationary coordinate system. For example, the Inpark transformation is performed on the electric potential instruction in each coordinate system to obtain the harmonic electric potential, including the negative sequence electric potential; and step S423, adding up the multiple harmonic electric potentials of the two-phase stationary coordinate system and then performing two-phase stationary/three-phase stationary (2s/3s) coordinate transformation to obtain the harmonic compensation electric potential.

It can be seen that in FIG. 5a, the reference value of the harmonic current is set to zero to obtain the error signal, the coordinate transformation is performed on the error signal to obtain the transformed error signals in the multiple coordinate systems, and the closed-loop regulation is performed on the transformed error signal in each coordinate system to output the electric potential compensation signal. While in FIG. 6, the coordinate transformation of the harmonic current is performed first to obtain the transformed signals of the harmonic current in the multiple coordinate systems, the reference value of the transformed signal of the harmonic current in each coordinate system is set to zero to obtain the error signal in each coordinate system, and the closed-loop regulation is performed on the error signal to output the electric potential compensation signal.

The control architecture corresponding to the control process in FIG. 6 is similar to that in FIG. 5b, and the difference therebetween lies in that after obtaining the d-axis and q-axis components $I_{dh}$ and $I_{qh}$ of the harmonic current, the d-axis and q-axis components $I_{dh}$ and $I_{qh}$ are input to the coordinate transformers 1TR2, 1TR4, 1TR6, 1TR8 and 1TR10. The coordinate transformer 1TR2 transforms the harmonic currents $I_{dh}$ and $I_{qh}$ from the positive sequence rotating coordinate system to the negative sequence rotating coordinate system according to the angle −2θ, and the d-axis and q-axis components $I_{dh2}$ and $I_{qh2}$ of the harmonic current in the negative sequence coordinate system are obtained. In the negative sequence coordinate system, the reference value of the harmonic current is 0, the feedback values of the harmonic current are $I_{dh2}$ and $I_{qh2}$, and the d-axis and q-axis components $I_{de2}$ and $I_{qe2}$ of the error signal in the negative sequence coordinate system are obtained. The coordinate transformer 1TR4 transforms the harmonic currents $I_{dh}$ and $I_{qh}$ from the positive sequence rotating coordinate system to the positive sequence 5th-order rotating coordinate system according to the angle 4θ to obtain the d-axis and q-axis components $I_{dh4}$ and $I_{qh4}$ of the harmonic current in the positive sequence 5th-order coordinate system. In the positive sequence 5th-order coordinate system, the reference value of the harmonic current is 0, the feedback values of the harmonic current are $I_{dh4}$ and $I_{qh4}$, and the d-axis and q-axis components $I_{de4}$ and $I_{qe4}$ of the harmonic current error signal in the positive sequence 5th-order coordinate system are obtained. The coordinate transformer 1TR6 transforms the harmonic currents $I_{dh}$ and $I_{qh}$ from the positive sequence rotating coordinate system to the negative sequence 5th-order rotating coordinate system according to the angle −6θ, and the d-axis and q-axis components $I_{dh5}$ and $I_{qh5}$ of the harmonic current in the negative sequence 5th-order coordinate system are obtained. In the negative sequence 5th-order coordinate system, the reference value of the harmonic current is 0, the harmonic current feedback values are $I_{dh5}$ and $I_{qh5}$, and the d-axis and q-axis components $I_{de5}$ and $I_{qe5}$ of the error signals in the negative sequence 5th-order coordinate system are obtained. The coordinate transformer 1TR8 transforms the harmonic currents $I_{dh}$ and $I_{qh}$ from the positive sequence rotating coordinate system to the positive sequence 7th-order rotating coordinate system according to the angle 6θ to obtain the d-axis and q-axis components $I_{dh6}$ and $I_{qh6}$ of the harmonic current in the positive sequence 7th-order coordinate system. In the positive sequence 7th-order coordinate system, the reference value of the harmonic current is 0, the harmonic current feedback values are $I_{dh6}$ and $I_{qh6}$, and the d-axis and q-axis components $I_{de6}$ and $I_{qe6}$ of the harmonic current error signals in the positive sequence 7th-order coordinate system are obtained. The coordinate transformer 1TR10 transforms the harmonic currents $I_{dh}$ and $I_{qh}$ from the positive sequence rotating coordinate system to the negative sequence 7th-order rotating coordinate system according to the angle −8θ, and the d-axis and q-axis components $I_{dh7}$ and $I_{qh7}$ of the harmonic current in the negative sequence 7th-order coordinate system are obtained. In the negative sequence 7th-order coordinate system, the reference value of the harmonic current is 0, the harmonic current feedback values are $I_{dh7}$ and $I_{qh7}$, and the d-axis and q-axis components $I_{de7}$ and $I_{qe7}$ of the error signals in the negative sequence 7th-order coordinate system are obtained. For the remaining similar parts, reference can be made to the description with respect to FIG. 5b, which will not be repeated here.

It should be noted that the above multiple coordinate systems include the negative sequence coordinate system, the positive sequence and negative sequence 5th-order coordinate systems, and the positive sequence and negative sequence 7th-order coordinate systems so as to achieve the effect of suppressing the negative sequence current, the positive sequence and negative sequence 5th-order harmonic currents, and the positive sequence and negative sequence 7th-order harmonic currents. However, the present disclosure is not limited thereto, and can also include coordinate systems of other frequency orders.

Figure 7A:
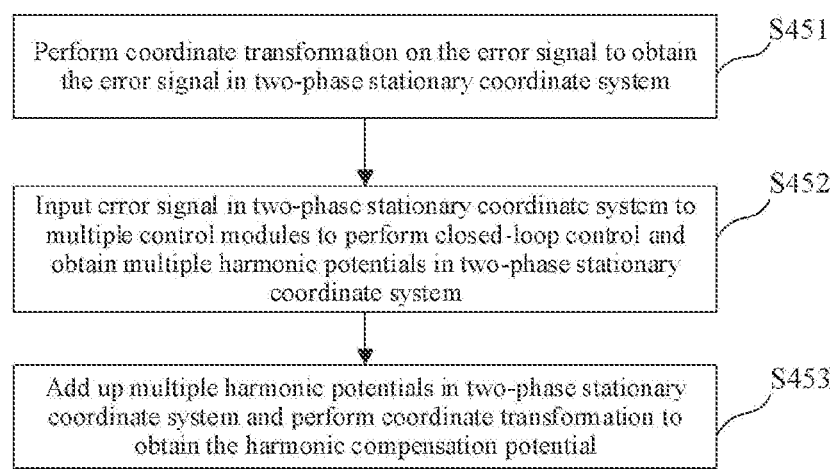
FIG. 7a schematically shows a flow chart of controlling a harmonic current according to another embodiment of the present disclosure.
Figure 7B:
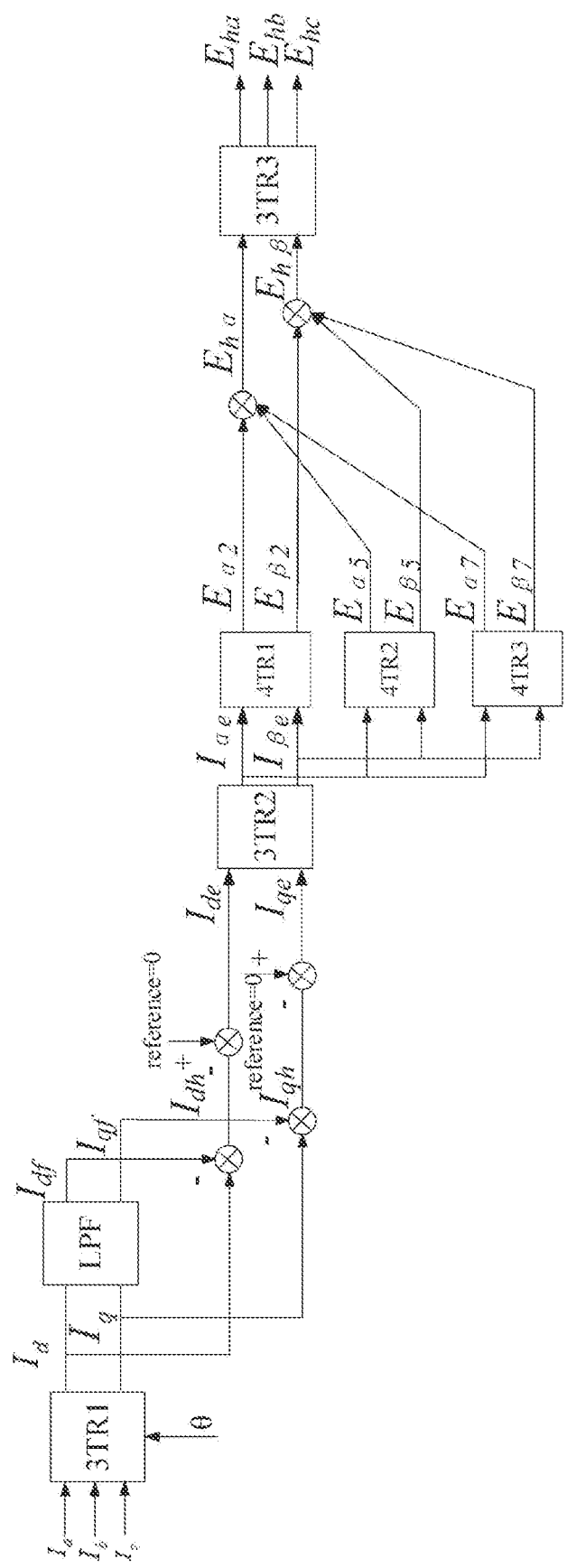

FIG. 7a is a flow chart of another control step of the harmonic current in the grid-connected mode, and FIG. 7b shows a control architecture corresponding to the control process in FIG. 7a. Compared with FIG. 5a, the step S4 in FIG. 7a is different. Only the differences will be described in detail below. For the same parts, reference can be made to FIG. 5a.

Step S4 may include the following sub-steps:

step S451, performing coordinate transformation on the error signal to obtain the error signal in the two-phase stationary coordinate system;

step S452, inputting the error signal in the two-phase stationary coordinate system to multiple control modules to perform closed-loop control and obtain multiple harmonic electric potentials in the two-phase stationary coordinate system; and at step S453, adding up the multiple harmonic electric potentials in the two-phase stationary coordinate system and then performing two-phase stationary/three-phase stationary (2s/3s) coordinate transformation to obtain the harmonic compensation electric potential.

As shown in FIG. 7b, the multiple control modules include a Proportional Resonance (PR) control module and two Resonance (R) control modules. The PR control module outputs a negative sequence electric potential, that is, the frequency of the negative sequence electric potential is ω, for example, 50 HZ. The two R control module output the $5^{th}$-order harmonic electric potential and the $7^{th}$-order harmonic electric potential, respectively, that is, the frequencies of the harmonic electric potentials are 5ω and 7ω, for example, 250 HZ and 350 Hz, respectively.

Referring to FIGS. 7a and 7b, coordinate transformers 3TR1 to 3TR3, a low-pass filter LPF, and current regulators 4TR1 to 4TR3 are included. The current regulators 4TR1 to 4TR3 are the PR control module and the two R control modules, respectively. The coordinate transformer 3TR1 receives the output current $I_{abc}$ and the angle signal θ, and transforms the output current $I_{abc}$ from the three-phase stationary coordinate system abc to the two-phase rotating coordinate system dq (3s/2r coordinate transformation) according to the angle signal θ to obtain a d-axis current signal $I_d$ and a q-axis current signal $I_q$. In another embodiment, the coordinate transformer 3TR1 receives the output current $I_{abc}$ and the angle signal θ, and first transforms the output current $I_{abc}$ from the three-phase stationary coordinate system abc to the two-phase stationary coordinate system αβ (3s/2s coordinate transformation) according to the angle signal θ, and then transforms it from the two-phase stationary coordinate system αβ to the two-phase rotating coordinate system dq (2s/2r coordinate transformation). The first-order low-pass filter LPF performs filtering on $I_d$ and $I_q$ to extract the fundamental currents $I_{df}$ and $I_{qf}$, and subtracts the fundamental currents $I_{df}$ and $I_{qf}$ is subtracted from the total current signals $I_d$ and $I_q$ to obtain the d-axis and q-axis components $I_{dh}$ and $I_{qh}$ of the harmonic current. The reference value of the harmonic current is 0, the feedback values of the harmonic current are $I_{dh}$ and $I_{qh}$, and the error signals $I_{de}$ and $I_{qe}$ are obtained.

The coordinate transformer 3TR2 performs Inpark coordinate transformation on the harmonic current error signals $I_{de}$ and $I_{qe}$ according to the angle θ to obtain the α-axis and β-axis components $I_{\alpha e}$ and $I_{\beta e}$ of the harmonic current error signals in the two-phase stationary coordinate system. The current regulator 4TR1 can be a proportional resonance (PR) regulator. The current regulator 4TR1 performs PR closed-loop regulation on $I_{\alpha e}$ and $I_{\beta e}$ in the two-phase stationary coordinate system to obtain the negative sequence electric potentials $E_{\alpha 2}$ and $E_{\beta 2}$ in the two-phase stationary coordinate system. The resonance frequency of PR regulation is ω, for example, 50 HZ. The current regulator 4TR2 can be a Resonant (R) regulator. The current regulator 4TR2 performs R closed-loop regulation on $I_{\alpha e}$ and $I_{\beta e}$ in the two-phase stationary coordinate system to obtain the 5th-order harmonic electric potentials $E_{\alpha 5}$ and $E_{\beta 5}$ in the two-phase stationary coordinate system. The resonant frequency of the resonance regulation is 5ω. The current regulator 4TR3 can be a resonant regulator and performs R closed-loop regulation on $I_{\alpha e}$ and $I_{\beta e}$ in the two-phase stationary coordinate system to obtain the 7th-order harmonic electric potentials $E_{\alpha 7}$ and $E_{\beta 7}$ in the two-phase stationary coordinate system, and the resonance frequency of the resonance regulation is 7ω.

The negative sequence electric potentials and the harmonic electric potentials of each order are added up to obtain total harmonic electric potentials $E_{h\alpha}$ and $E_{h\beta}$ in the two-phase stationary coordinate system. The coordinate transformer 3TR3 transforms the harmonic electric potentials $E_{h\alpha}$ and $E_{h\beta}$ in the two-phase stationary coordinate system from the two-phase stationary coordinate system to the three-phase stationary coordinate system to obtain the harmonic compensation electric potential $E_{habc}$. The harmonic compensation electric potential $E_{habc}$ is added to the fundamental electric potential $E_{abc}$ to obtain the control electric potential.

In some other embodiments, the control block diagram in FIG. 7b can also be modified as follows. After obtaining the d-axis and q-axis components $I_{dh}$ and $I_{qh}$ of the harmonic current, they are first input to the coordinate transformer 3TR2 for Inpark transformation to obtain the α-axis and β-axis components and $I_{\alpha h}$ and $I_{\beta h}$ of the harmonic current in the two-phase stationary coordinate system. The reference value of the harmonic current is 0, the feedback values are $I_{\alpha h}$ and $I_{\beta h}$, the error signals $I_{\alpha e}$ and $I_{\beta e}$ in the two-phase stationary coordinate system are obtained. The closed-loop regulation is performed on $I_{\alpha e}$ and $I_{\beta e}$ in the two-phase stationary coordinate system to obtain the harmonic electric potentials of respective orders in the two-phase stationary coordinate system, where the harmonic electric potentials of the of respective orders have different frequencies.

When the three-phase AC system is operating in the off-grid mode, especially with asymmetric or non-linear loads, the harmonic voltage control is activated and the harmonic current control is disabled. Therefore, in step S3, the output signal corresponds to the output voltage and the harmonic component corresponds to the harmonic voltage, the harmonic voltage in the output voltage of the inverter 201 is extracted, the harmonic voltage error signal is obtained according to the harmonic voltage reference value, and the error signal is regulated to obtain the harmonic compensation electric potential.

The three-phase AC system operating in the off-grid mode is also known as operating in an island mode.

Figure 8A:
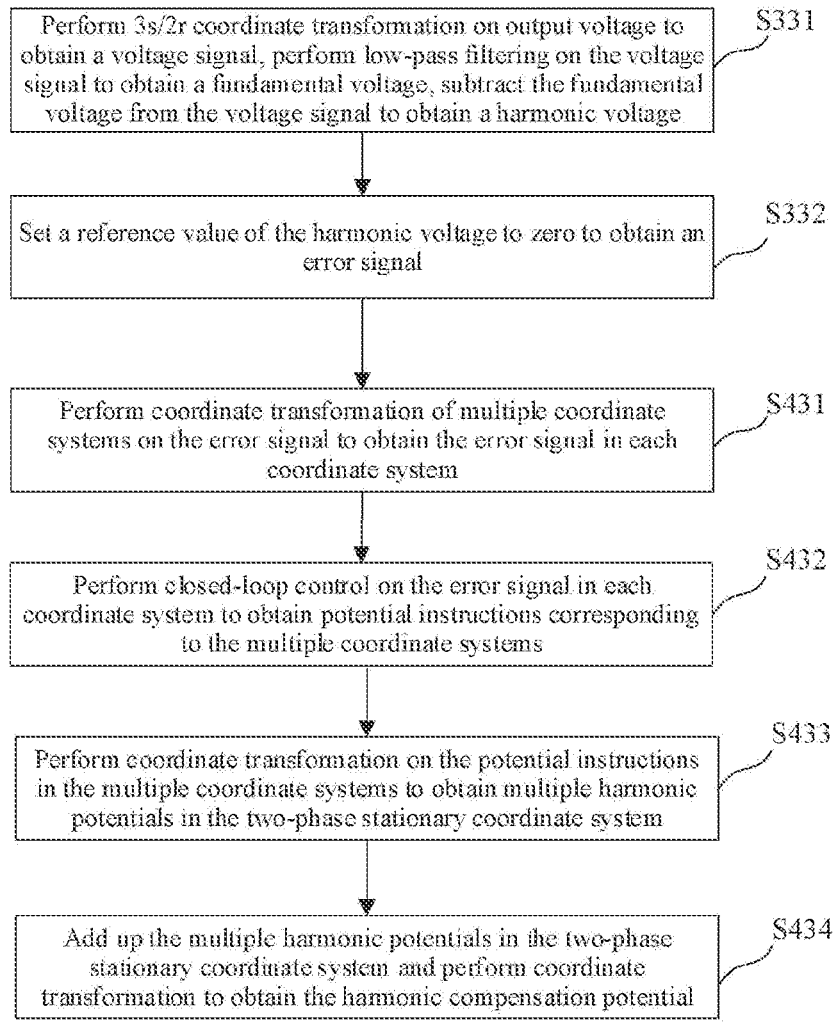
FIG. 8a schematically shows a flow chart of controlling a harmonic voltage according to another embodiment of the present disclosure.

FIG. 8a is a flow chart of the control steps of the harmonic voltage in the off-grid mode, and FIG. 81) shows a control architecture corresponding to the control process in FIG. 8a. Specifically, as shown in FIG. 8a, step S3 may include the following sub-steps:

step S331, performing three-phase stationary/two-phase rotating (3s/2r) coordinate transformation on the output voltage to obtain a voltage signal, performing low-pass filtering on the voltage signal to obtain a fundamental voltage, and subtracting the fundamental voltage from the voltage signal to obtain a harmonic voltage. The voltage signal is essentially a d-axis voltage $U_d$ and a q-axis voltage $U_q$ of the output voltage in the dq coordinate system; and step S332, selling a reference value of the harmonic voltage to zero to obtain an error signal. The error signal is essentially a difference between the harmonic voltage and zero, that is, the error signal is obtained by subtracting the harmonic voltage from zero.

Step S4 may include the following sub-steps:

step S431, performing coordinate transformation of multiple coordinate systems on the error signal to obtain an error signal in each of the coordinate systems. For example, the error signal is subjected to Park transformation to obtain the error signal components in the multiple coordinate systems, so as to perform closed-loop control on the error signal components in the coordinate systems;

step S432, performing closed-loop control on the error signal in each of the coordinate systems to obtain electric potential instructions corresponding to the multiple coordinate systems;

step S433, performing coordinate transformation on the electric potential instructions in the multiple coordinate systems to obtain multiple harmonic electric potentials in the two-phase stationary coordinate system. For example, Inpark transformation is performed on the electric potential instructions of the multiple coordinate systems to obtain the multiple harmonic electric potentials in the two-phase stationary coordinate system, where the angular frequencies of the multiple harmonic electric potentials are different; and S434, adding up the multiple harmonic electric potentials of the two-phase stationary coordinate system and then performing two-phase stationary/three-phase stationary (2s/3s) coordinate transformation to obtain the harmonic compensation electric potential.

Figure 8B:
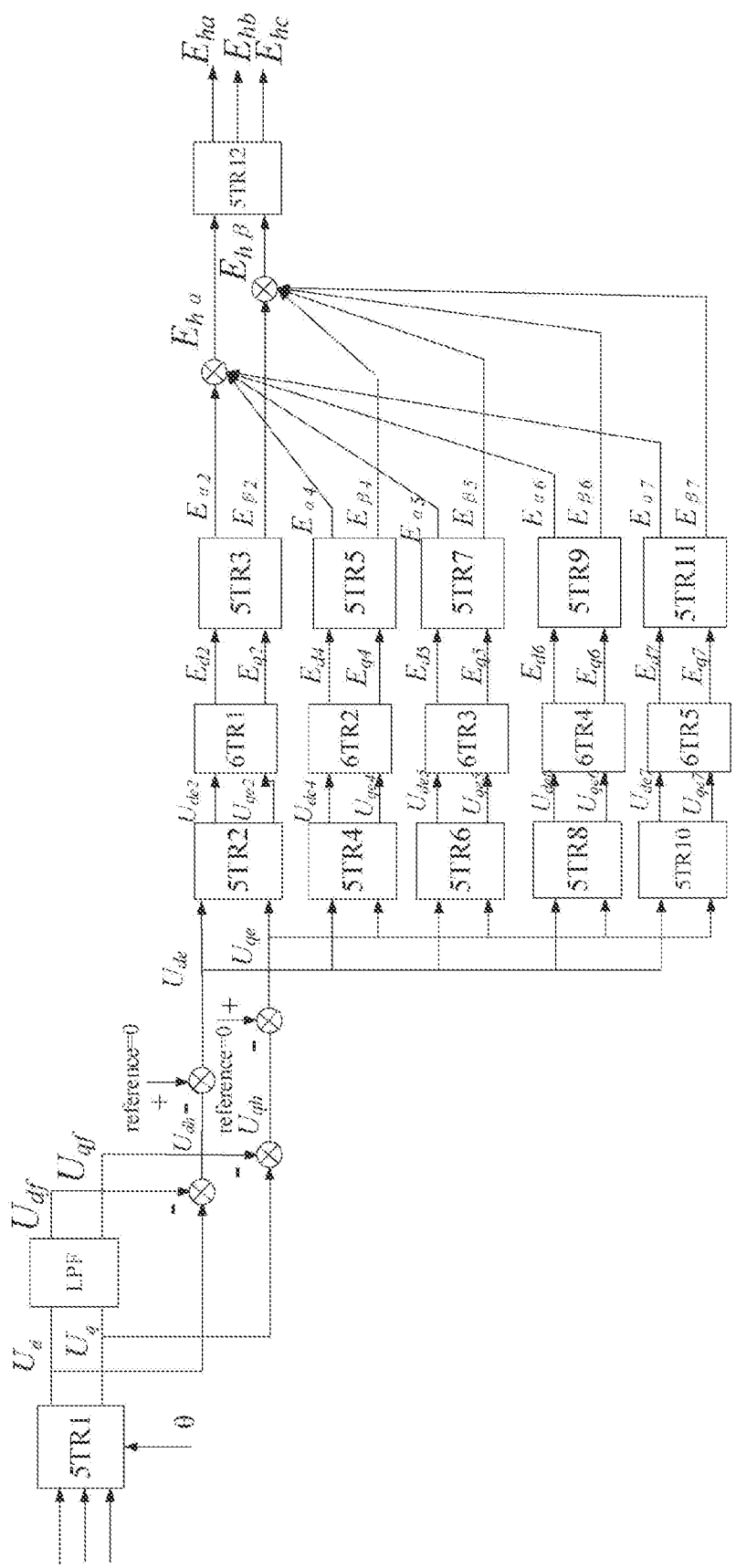

Referring to FIGS. 8a and 8b, coordinate transformers 5TR1 to 5TR12, a low-pass filter LPF, and voltage regulators 6TR1 to 6TR5 are included. The coordinate transformer 5TR1 receives the output voltage $U_{abc}$ and the angle signal θ, and transforms the output voltage $U_{abc}$ from the three-phase stationary coordinate system abc to the two-phase rotating coordinate system dq (3s/2r coordinate transformation) according to the angle signal θ to obtain a d-axis voltage signal $U_d$ and a q-axis voltage signal $U_q$. In another embodiment, the coordinate transformer 1TR1 receives the output voltage $U_{abc}$ and the angle signal θ, and first transforms the output voltage from the three-phase stationary coordinate system abc to the two-phase stationary coordinate system αβ (3s/2s coordinate transformation) according to the angle signal θ, and then transforms it from the two-phase stationary coordinate system αβ to the two-phase rotating coordinate system dq (2s/2r coordinate transformation). The first-order low-pass filter LPF performs filtering on $U_d$ and $U_q$ to extract the fundamental voltages $U_{df}$ and $U_{qf}$, and the fundamental voltages $U_{df}$ and $U_{qf}$ are subtracted from the total voltage signals $U_d$ and $U_q$ to obtain the harmonic voltages $U_{dh}$ and $U_{qh}$. The reference value of the harmonic voltage is 0, the feedback values of the harmonic voltage are $U_{dh}$ and $U_{qh}$, and the error signals $U_{de}$ and $U_{qe}$ are obtained.

The coordinate transformer 5TR2 transforms the error signals $U_{de}$ and $U_{qe}$ from a positive sequence rotating coordinate system to a negative sequence rotating coordinate system according to the angle −2θ to obtain d-axis and q-axis components $U_{de2}$ and $U_{qe2}$ of the error signals in the negative sequence coordinate system. The voltage regulator 6TR1 can be a proportional-integral regulator. The voltage regulator 6TR1 performs proportional-integral (PI) closed-loop regulation on the d-axis and q-axis components $U_{de2}$ and $U_{qe2}$ to obtain the electric potential instructions $E_{d2}$ and $E_{q2}$, in the negative sequence coordinate system. The coordinate transformer 5TR3 transforms the negative sequence electric potential instructions $E_{d2}$ and $E_{q2}$ from the negative sequence rotating coordinate system to the two-phase stationary coordinate system according to the angle θ to obtain the negative sequence electric potentials $E_{α2}$ and $E_{β2}$ in the two-phase stationary coordinate system. It should be noted that in the present disclosure, it needs to suppress the negative sequence component in the output voltage, that is, the harmonic control includes the control on the negative sequence component. The actual frequency of the negative sequence component is also w, for example, 50 HZ, which is the fundamental negative sequence component.

The coordinate transformer 5TR4 transforms the harmonic voltage error signals $U_{de}$ and $V_{qe}$ from the positive sequence rotating coordinate system to the positive sequence $5^{th}$-order rotating coordinate system according, to the angle 4θ, and the d-axis and q-axis components $U_{de4}$ and $U_{qe4}$ of the harmonic voltage error signals in the positive sequence $5^{th}$-order coordinate system are obtained. The voltage regulator 6TR2 can be an integral regulator. The voltage regulator 6TR2 performs integral (I) closed-loop regulation on the d-axis and q-axis components $U_{de4}$ and $U_{qe4}$ to obtain the electric potential instructions $E_{d4}$ and $E_{q4}$ in the positive sequence 5th-order coordinate system. The coordinate transformer 5TR5 transforms the positive sequence 5th-order electric potential instructions $E_{d4}$ and $E_{q4}$ from the positive sequence 5th-order rotating coordinate system to the two-phase stationary coordinate system according to the angle 5θ, and the positive sequence 5th-order harmonic electric potentials $E_{α4}$ and $E_{β4}$ in the two-phase stationary coordinate system are obtained.

The coordinate transformer 5TR6 transforms the harmonic voltage error signals $U_{de}$ and $U_{qe}$ from the positive sequence rotating coordinate system to the negative sequence 5th-order rotating coordinate system according to the angle −6θ, and the d-axis and q-axis components $U_{de5}$ and $U_{qe5}$ of the error signals in the negative sequence 5th-order coordinate system are obtained. The voltage regulator 6TR3 can be an integral regulator. The voltage regulator 6TR3 performs integral (I) closed-loop regulation on the d-axis and q-axis components $U_{de5}$ and $U_{qe5}$ to obtain the electric potential instructions $E_{d5}$ and $E_{q5}$ in the negative sequence 5th-order coordinate system. The coordinate transformer 5TR7 transforms the negative sequence 5th-order electric potential instructions $E_{d5}$ and $E_{q5}$ from the negative sequence 5th-order rotating coordinate system to the two-phase stationary coordinate system according to the angle −5θ, and the negative sequence 5th-order harmonic electric potentials $E_{α5}$ and $E_{β5}$ in the two-phase stationary coordinate system are obtained.

The coordinate transformer 5TR8 transforms the harmonic voltage error signals $U_{de}$ and $U_{qe}$ from the positive sequence rotating coordinate system to the positive sequence 7th-order rotating coordinate system according to the angle 6θ, and the d-axis and q-axis components $U_{de6}$ and $U_{qe6}$ of the error signals in the positive sequence 7th-order coordinate system are obtained. The voltage regulator 6TR4 can be an integral regulator. The voltage regulator 6TR4 performs integral (I) closed-loop regulation on the d-axis and q-axis components $U_{de6}$ and $U_{qe6}$ to obtain the electric potential instructions $E_{d6}$ and $E_{q6}$ in the positive sequence 7th-order coordinate system. The coordinate transformer 5TR9 transforms the positive sequence 7th-order electric potential instructions $E_{d6}$ and $E_{q6}$ from the positive sequence 7th-order rotating coordinate system to the two-phase stationary coordinate system according to the angle 7θ, and the positive sequence 7th-order harmonic electric potentials $E_{α6}$ and $E_{β6}$ in the two-phase stationary coordinate system are obtained.

The coordinate transformer 5TR10 transforms the harmonic voltage error signals $U_{de}$ and $U_{qe}$ from the positive sequence rotating coordinate system to the negative sequence 7th-order rotating coordinate system according to the angle −8θ, and the d-axis and q-axis components $U_{de7}$ and $U_{qe7}$ of the harmonic voltage error signals in the negative sequence 7th-order coordinate system are obtained. The voltage regulator 6TR5 can be an integral regulator. The voltage regulator 6TR5 performs integral (I) closed-loop regulation on the d-axis and q-axis components $U_{de7}$ and $U_{qe7}$ to obtain the electric potential instructions $E_{d7}$ and $E_{q7}$ in the negative sequence 7th-order coordinate system. The coordinate transformer 5TR11 transforms the negative sequence 7th-order electric potential instructions $E_{d7}$ and $E_{q7}$ from the negative sequence 7th-order rotating coordinate system to the two-phase stationary coordinate system according to the angle −7θ, and the negative sequence 7th-order harmonic electric potentials $E_{α7}$ and $E_{β7}$ in the two-phase stationary coordinate system are obtained.

The negative sequence electric potentials and the harmonic electric potentials of respective orders are added up to obtain a total harmonic electric potential $E_{hα}$ and $E_{hβ}$ in the two-phase stationary coordinate system. The coordinate transformer 5TR12 transforms the harmonic electric potentials $E_{hα}$ and $E_{hβ}$ in the two-phase stationary coordinate system from the two-phase stationary coordinate system to the three-phase stationary coordinate system to obtain the harmonic compensation electric potential $E_{habc}$. The harmonic compensation electric potential $E_{habc}$ is added to the fundamental electric potential $E_{abc}$ to obtain the control electric potential.

Figure 9:
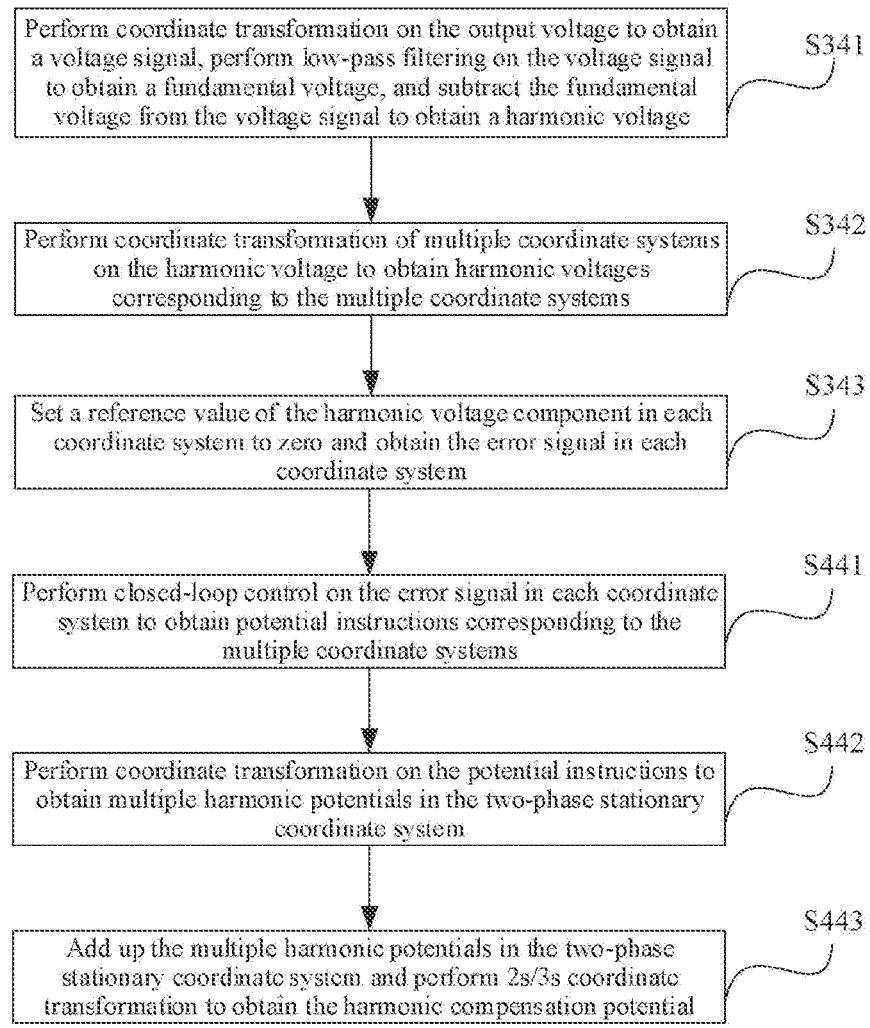
FIG. 9 schematically shows a flow chart of controlling a harmonic voltage according to another embodiment of the present disclosure.

FIG. 9 is a flow chart of another control step of the harmonic voltage in the off-grid mode. Specifically, as shown in FIG. 9, step S3 may include the following sub-steps:

step S341, performing (3s/2r) coordinate transformation on the output voltage to obtain a voltage signal, performing low-pass filtering on the voltage signal to obtain a fundamental voltage, and subtracting the fundamental voltage from the voltage signal to obtain a harmonic voltage. The voltage signal is essentially a d-axis voltage $U_d$ and a q-axis voltage $U_q$ of the output voltage in the dq coordinate system;

step S342, performing coordinate transformation of multiple coordinate systems on the harmonic voltage to obtain harmonic voltages corresponding to the multiple coordinate systems. For example, the harmonic voltage is subjected to Park transformation of multiple coordinate systems so as to obtain the harmonic voltages in the multiple coordinate systems, and step S343, setting a reference value of the harmonic voltage component in each of the coordinate systems to zero, and obtaining the error signal in each of the coordinate systems. The error signal in each of the coordinate systems is essentially a difference between the harmonic voltage and zero in each coordinate system, that is, the error signal is obtained by subtracting the harmonic voltage from zero.

Step S4 may include the following sub-steps:

step S441, performing closed-loop control on the error signal in each of the coordinate systems to obtain electric potential instructions corresponding to the multiple coordinate systems;

step S442, performing coordinate transformation on the electric potential instructions to obtain multiple harmonic electric potentials in the two-phase stationary coordinate system. For example, the Inpark transformation is performed on the electric potential instruction in each coordinate system to obtain the harmonic electric potential, including the negative sequence electric potential; and step S443, adding up the multiple harmonic electric potentials in the two-phase stationary coordinate system and then performing two-phase stationary/three-phase stationary (2s/3s) coordinate transformation to obtain the harmonic compensation electric potential.

It can be seen that the difference between the steps in FIG. 8a and FIG. 9 lies in that in the steps in FIG. 8a, the reference value of the harmonic voltage is first set to zero to obtain the error signal, the coordinate transformation is performed on the error signal to obtain the transformed error signals in the multiple coordinate systems, and the closed-loop regulation is performed on the transformed error signal in each coordinate system to output the electric potential compensation signal. While in the steps of FIG. 9, the coordinate transformation is first performed on the harmonic voltage to obtain the transformed signals of the harmonic voltage in multiple coordinate systems, the reference value of the transformed signal of the harmonic voltage in each coordinate system is set to zero to obtain the error signal in each coordinate system, the closed-loop regulation is performed on the error signal in each coordinate system to output the electric potential compensation signal. These two methods can both obtain the harmonic compensation electric potential finally.

The control architecture corresponding to the control process in FIG. 9 is similar to that in FIG. 8b, and the difference therebetween lies in that after obtaining the d-axis and q-axis components $U_{dh}$ and $U_{qh}$ of the harmonic voltage, the d-axis and q-axis components $U_{dh}$ and $U_{qh}$ are directly input to the coordinate transformers 5TR2, 5TR4, 5TR6, 5TR8 and 5TR10. The coordinate transformer 5TR2 transforms the harmonic voltages $U_{dh}$ and $U_{qh}$ from the positive sequence rotating coordinate system to the negative sequence rotating coordinate system according to the angle $-2\theta$, and the d-axis and q-axis components $U_{dh2}$ and $U_{qh2}$ of the harmonic voltage in the negative sequence coordinate system are obtained. In the negative sequence coordinate system, the reference value of the harmonic voltage is 0, the feedback values of the harmonic voltage are $U_{dh2}$ and $U_{qh2}$, and the d-axis and q-axis components $U_{de2}$ and $U_{qe2}$ of the error signal in the negative sequence coordinate system are obtained. The coordinate transformer 5TR4 transforms the harmonic voltages $U_{dh}$, and $U_{qh}$ from the positive sequence rotating coordinate system to the positive sequence 5th-order rotating coordinate system according to the angle $4\theta$ to obtain the d-axis and q-axis components $U_{dh4}$ and $U_{qh4}$ of the harmonic voltage in the positive sequence 5th-order coordinate system. In the positive sequence 5th-order coordinate system, the reference value of the harmonic voltage is 0, the feedback values of the harmonic voltage are $U_{dh4}$ and $U_{qh4}$, and the d-axis and q-axis components $U_{de4}$ and $U_{qe4}$ of the harmonic voltage error in the positive sequence 5th-order coordinate system are obtained. The coordinate transformer 5TR6 transforms the harmonic voltages $U_{dh}$ and $U_{qh}$ from the positive-sequence rotating coordinate system to the negative-sequence 5th-order rotating coordinate system according to the angle $-6\theta$, and the d-axis and q-axis components $U_{dh5}$ and $U_{qh5}$ of the harmonic voltage in the negative sequence 5th-order coordinate system are obtained. In the negative sequence 5th-order coordinate system, the reference value of the harmonic voltage is 0, the harmonic current feedback values are $U_{dh5}$ and $U_{qh5}$, and the d-axis and q-axis components $U_{de5}$ and $U_{qe5}$ of the error signal in the negative sequence 5th-order coordinate system are obtained. The coordinate transformer 5TR8 transforms the harmonic voltages $U_{dh}$ and $U_{qh}$ from the positive sequence rotating coordinate system to the positive sequence 7th-order rotating coordinate system according to the angle $6\theta$ to obtain the d-axis and q-axis components $U_{dh6}$ and $U_{qh6}$ of the harmonic voltage in the positive sequence 7th-order coordinate system. In the positive sequence 7th-order coordinate system, the reference value of the harmonic voltage is 0, the harmonic voltage feedback values are $U_{dh6}$ and $U_{qh6}$, and the d-axis and q-axis components $U_{de6}$ and $U_{qe6}$ of the harmonic voltage error signal in the positive sequence 7th-order coordinate system are obtained. The coordinate transformer 5TR10 transforms the harmonic voltages $U_{dh}$ and $U_{qh}$ from the positive sequence rotating coordinate system to the negative sequence 7th-order rotating coordinate system according to the angle $-8\theta$, and the d-axis and q-axis components $U_{dh7}$ and $U_{qh7}$ of the harmonic voltage in the negative sequence 7th-order coordinate system are obtained. In the negative sequence 7th-order coordinate system, the reference value of the harmonic voltage is 0, the harmonic voltage feedback values are $U_{dh7}$ and $U_{qh7}$, and the d-axis and q-axis components $U_{de7}$ and $U_{qe7}$ of the harmonic voltage error signals in the negative sequence 7th-order coordinate system are obtained. For the remaining similar parts, reference can be made to the description with respect to FIG. 8b, which will not be repeated here.

It should be noted that the above multiple coordinate systems include the negative sequence coordinate system, the positive sequence and negative sequence 5th-order coordinate systems, and the positive sequence and negative sequence 7th-order coordinate systems so as to achieve the effect of suppressing the negative sequence voltage, the positive sequence and negative sequence 5th-order harmonic voltages, and the positive sequence and negative sequence 7th-order harmonic voltages. However, the present disclosure is not limited thereto, and can also include coordinate systems of other frequency orders.

Figure 10:
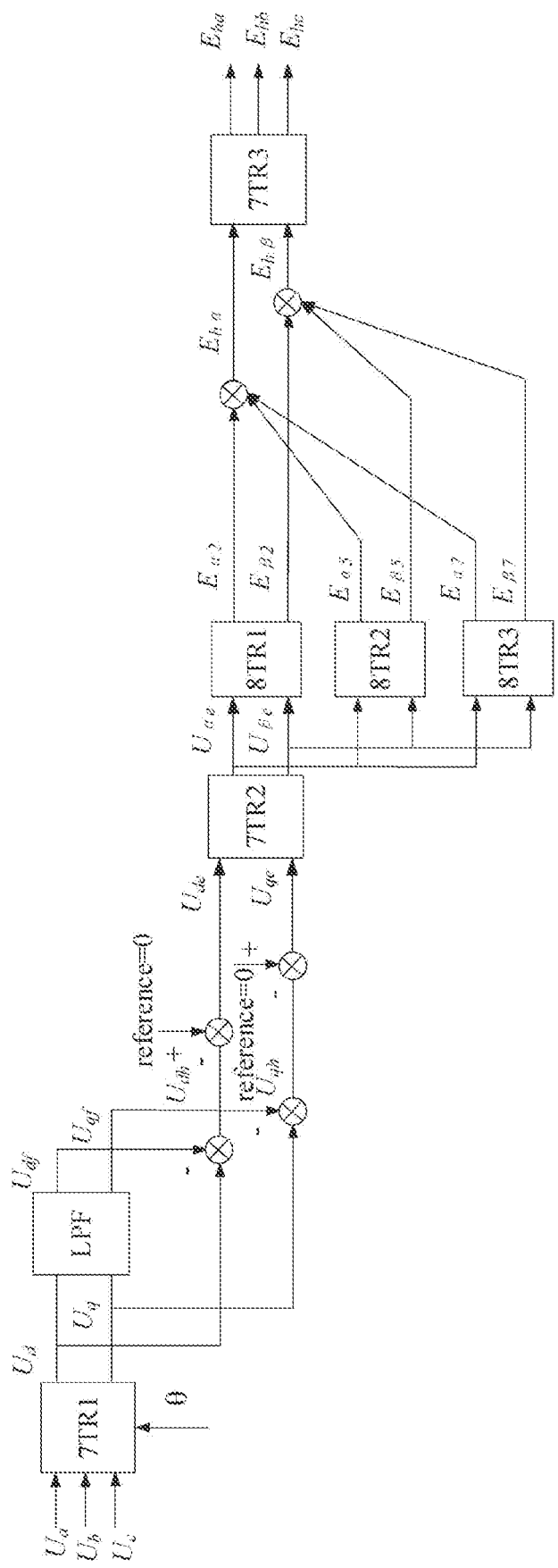
FIG. 10 schematically shows a schematic diagram of a control structure of a harmonic voltage according to another embodiment of the present disclosure.

FIG. 10 shows another control architecture for the harmonic voltage in the off-grid mode. Compared with FIG. 8a, the step S4 in the control flow corresponding to FIG. 10 is different. Only the differences will be described in detail below. For the same parts, reference can be made to FIG. 8a.

Step S4 may include the following sub-steps:

step S451, performing coordinate transformation on the error signal to obtain the error signal in the two-phase stationary coordinate system;

step S452, inputting the error signal in the two-phase stationary coordinate system to multiple control modules to perform closed-loop control to obtain multiple harmonic electric potentials in the two-phase stationary coordinate system; and step S453, adding up the multiple harmonic electric potentials in the two-phase stationary coordinate system and then performing two-phase stationary/three-phase stationary (2s/3s) coordinate transformation to obtain the harmonic compensation electric potential.

As shown in FIG. 10, the multiple control modules include a Proportional Resonance (PR) control module and two Resonance (R) control modules. The PR control module outputs a negative sequence electric potential, that is, the frequency of the negative sequence electric potential is ω, for example, 50 HZ. The two R control modules output the $5^{th}$-order harmonic electric potential and the $7^{th}$-order harmonic electric potential, respectively, that is, the frequencies of the harmonic electric potentials are 5ω and 7ω, for example, 250 HZ and 350 HZ, respectively.

Referring to FIG. 10, coordinate transformers 7TR1 to 7TR3, a low-pass filter LPF, and voltage regulators 8TR1 to 8TR3 are included. The coordinate transformer 7TR1 receives the output voltage $U_{abc}$ and the angle signal θ, and transforms the output voltage $U_{abc}$ from the three-phase stationary coordinate system abc to the two-phase rotating coordinate system dq (3s/2r coordinate transformation) according to the angle signal θ to obtain a d-axis voltage signal $U_d$ and a q-axis voltage signal $U_q$. In another embodiment, the coordinate transformer 7TR1 receives the output voltage $U_{abc}$ and the angle signal θ, and first transforms the output voltage $U_{abc}$ from the three-phase stationary coordinate system abc to the two-phase stationary coordinate system αβ (3s/2s coordinate transformation) according to the angle signal θ, and then transforms it from the two-phase stationary coordinate system αβ to the two-phase rotating coordinate system dq (2s/2r coordinate transformation). The first-order low-pass filter LPF performs filtering on $U_d$ and $U_q$ to extract the fundamental voltages $U_{df}$ and $U_{qf}$, and the fundamental voltages $U_{df}$ and $U_{qf}$ are subtracted from the total voltage signals $U_d$ and $U_q$ to obtain the d-axis and q0axis components $U_{dh}$ and $U_{qh}$ of the harmonic voltages. The reference value of the harmonic voltage is 0, the feedback values of the harmonic voltage are $U_{dh}$ and $U_{qh}$, and the error signals $U_{de}$ and $U_{qe}$ are obtained.

The coordinate transformer 7TR2 performs Inpark coordinate transformation on the harmonic voltage error signals $U_{de}$ and $U_{βe}$ according to the angle θ to obtain the α-axis and β-axis components $U_{αe}$ and $U_{βe}$ of the error signals in the two-phase stationary coordinate system. The voltage regulator 8TR1 can be a proportional resonance (PR) regulator.

The voltage regulator 8TR1 performs PR closed-loop regulation on $U_{αe}$ and $U_{βe}$ in the two-phase stationary coordinate system to obtain the negative sequence electric potentials $E_{α2}$ and $E_{β2}$ in the two-phase stationary coordinate system. The resonance frequency of PR regulation is ω, for example, 50 HZ. The voltage regulator 8TR2 can be a Resonant (R) regulator. The voltage regulator 8TR2 performs R closed-loop regulation on $U_{αe}$ and $U_{βe}$ in the two-phase stationary coordinate system to obtain the 5th-order harmonic electric potentials $E_{α5}$ and $E_{β5}$ in the two-phase stationary coordinate system. The resonant frequency of the resonance regulation is 5ω. The voltage regulator 8TR3 can be a resonant regulator and performs R closed-loop regulation on $U_{αe}$ and $U_{βe}$ in the two-phase stationary coordinate system to obtain the 7th-order harmonic electric potentials $E_{α7}$ and $E_{β7}$ in the two-phase stationary coordinate system, and the resonance frequency of the resonance regulation is 7ω.

The negative sequence electric potentials and the harmonic electric potentials of respective orders are added up to obtain total harmonic electric potentials $E_{hα}$ and $E_{hβ}$ in the two-phase stationary coordinate system. The coordinate transformer 7TR3 transforms the harmonic electric potentials $E_{hα}$ and $E_{hβ}$ in the two-phase stationary coordinate system from the two-phase stationary coordinate system to the three-phase stationary coordinate system to obtain the harmonic compensation electric potential $E_{habc}$. The harmonic compensation electric potential $E_{habc}$ is added to the fundamental electric potential $E_{abc}$ to obtain the control electric potential.

In some other embodiments, the control block diagram in FIG. 10 can also be modified as follows. After obtaining the d-axis and q-axis components $U_{dh}$ and $U_{qh}$ of the harmonic voltage, they are first input to the coordinate transformer 7TR2 for Inpark transformation so as to obtain the α-axis and β-axis components $U_{αh}$ and $U_{βh}$ of the harmonic voltage in the two-phase stationary coordinate system. The reference value of the harmonic voltage is 0, the feedback values are $U_{αh}$ and $U_{βh}$, the error signals $U_{αe}$ and $U_{βe}$ in the two-phase stationary coordinate system are obtained, and the closed-loop regulation is performed on $U_{αe}$ and $U_{βe}$ in the two-phase stationary coordinate system to obtain the harmonic electric potentials of respective orders in the two-phase stationary coordinate system. For other similar parts, reference can be made to the description with respect to FIG. 10, which will not be repeated here. Reference can be made to FIG. 9 for the specific step flow chart, which will not be repeated here.

Figure 11:
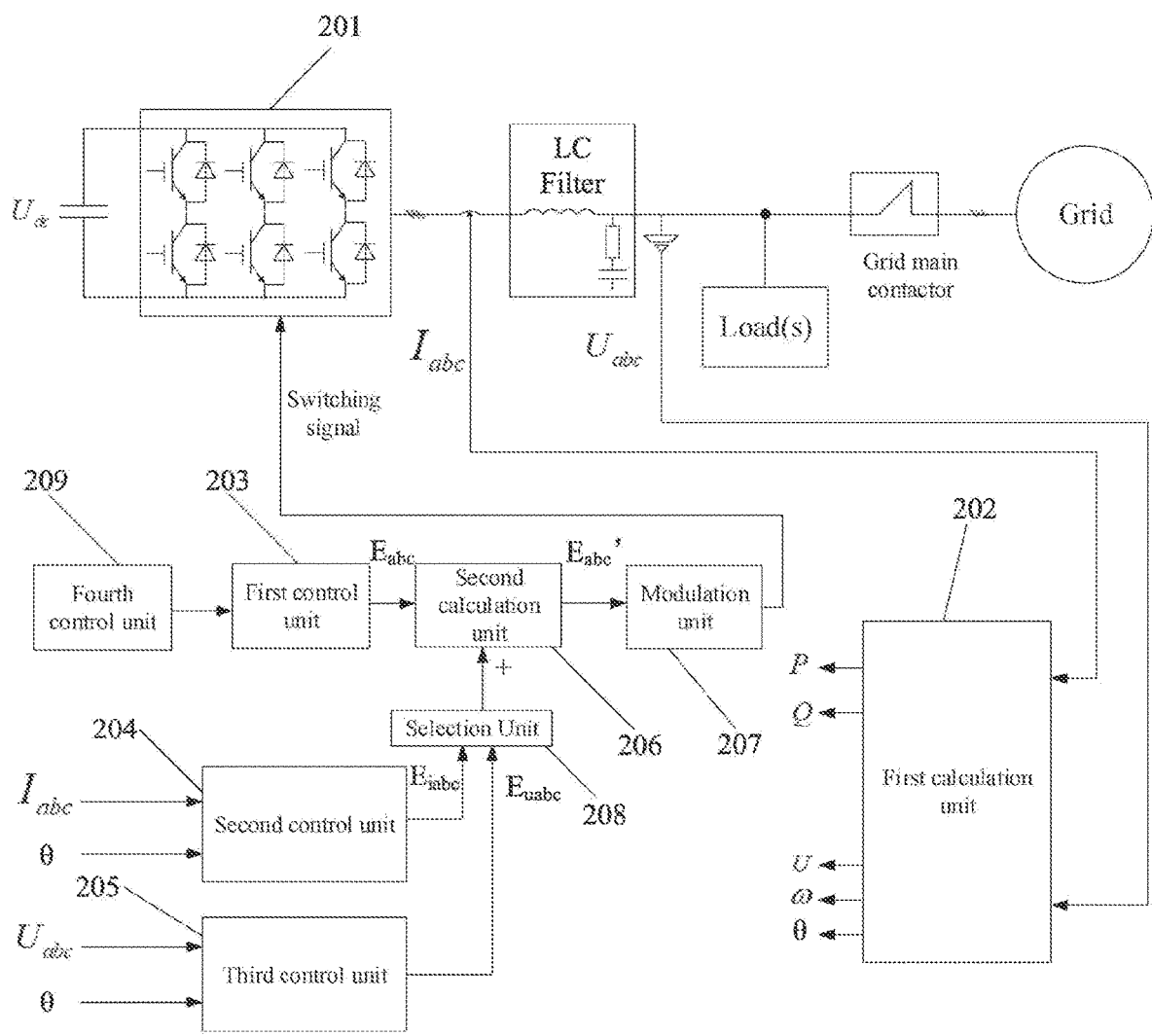
FIG. 11 schematically shows a schematic diagram of a three-phase AC system according to another embodiment of the present disclosure.

FIG. 11 is another schematic diagram of the three-phase AC system. Compared with the three-phase AC system shown in FIG. 2, the three-phase AC system shown in FIG. 11 includes island detection function. As shown in FIG. 11, the control device in the three-phase AC system further includes a fourth control unit 209, which is electrically connected to the first control unit 203 and is used for the island detection. The first control unit (Virtual Synchronizer Control Unit) includes droop control, and the output of the fourth control unit 209 is superimposed on at least one reference value of the droop control.

Figure 12:
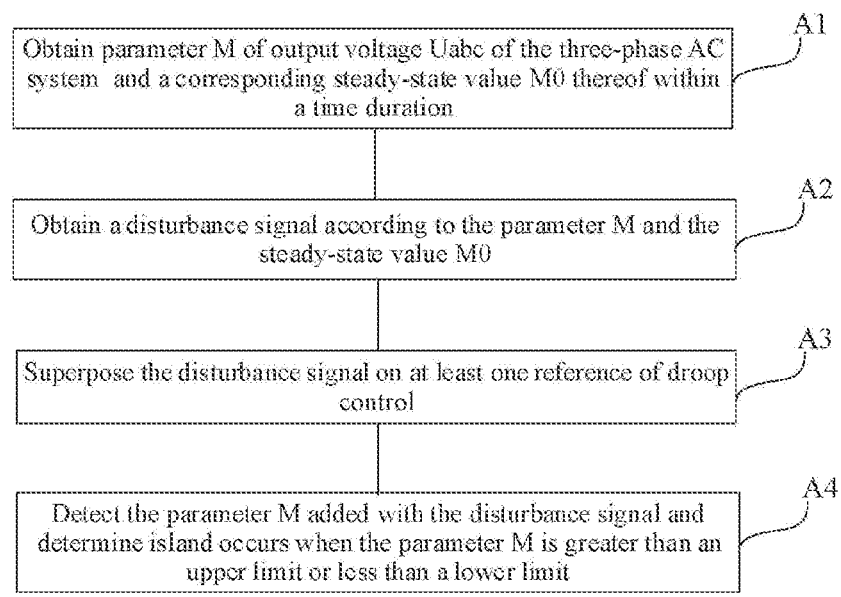
FIG. 12 schematically shows a flowchart of an islanding detection method according to an embodiment of the present disclosure.

FIG. 12 is a flow chart of steps of an island determination method. As shown in FIG. 12, the island determination method includes:

step A1, obtaining a parameter M of an output voltage $U_{abc}$ of the three-phase AC system and a steady-state value $M_0$ corresponding to the parameter M within a period of time;

step A2, obtaining a disturbance signal according to the parameter M and the steady-state value $M_0$;

step A3, superimposing the disturbance signal on at least one reference value of a droop control; and step A4, detecting the parameter M added with the disturbance signal, and determining that island occurs when the parameter M is greater than an upper limit or less than a lower limit.

At step A1, the parameter M of the output voltage $U_{abc}$ is an amplitude U or an angular frequency ω of the voltage, which can be obtained by phase-locking the output voltage $U_{abc}$ by the phase locker in FIG. 3. The steady-state value $M_0$ is obtained by filtering the parameter M for the period of time, and the period of time can be set according to the actual situation. Specifically, when the parameter M is the voltage amplitude U, the steady-state value $M_0$ corresponds to $U_0$, which can be obtained by filtering the voltage amplitude U for the period of time and which can correspond to an average value of the voltage amplitude within the period of time. When the parameter M is the angular frequency ω, the steady-state value $M_0$ corresponds to $\omega_0$, which can be obtained by filtering the angular frequency ω for the period of time and which can correspond to an average value of the angular frequency within the period of time.

Step A2 further includes sub-steps of:

step A21, comparing the steady-state value $M_0$ with the parameter M;

step A22, superimposing the parameter M with an increment δ to obtain a new parameter M' when the steady state value $M_0$ and the parameter M are not equal to each other; and step A23, calculating an error between the steady-state value $M_0$ and the new parameter M', and reversing the error to obtain the disturbance signal.

When the steady-state value $M_0$ is greater than the parameter M, the increment δ is negative, the error between the steady-state value $M_0$ and the new parameter M' is positive, the disturbance signal is negative, and reverse disturbance is superimposed on the reference value of the droop control. During grid-connected operation, since the output voltage $U_{abc}$ is clamped by the grid, the real-time parameter M will not change or will change slightly, the change of the reference value of the droop control is small, and the reverse disturbance effect is not significant. If the island occurs, the reference value of the droop control is superimposed with the reverse disturbance. The real-time parameter M decreases, an absolute value of the disturbance signal increases, the reverse disturbance increases, and the real-time parameter M further decreases, and finally reaches the lower limit, so it is determined that the island occurs.

On the other hand, when the steady-state value $M_0$ is less than the parameter M, the increment δ is positive, the error between the steady-state value $M_0$ and the new parameter M' is negative, the disturbance signal is positive, and forward disturbance is superimposed on the reference value of the droop control. During the grid-connected operation, since the output voltage $U_{abc}$ is clamped by the grid, the real-time parameter M will not change or will change slightly, the change of the reference value of the droop control is small, and the forward disturbance effect is not significant. If the island occurs, the reference value of the droop control is superimposed with the forward disturbance. The real-time parameter M decreases, the disturbance signal increases, the forward disturbance increases, and the real-time parameter M further increases, and finally reaches the upper limit, so it is determined that the island occurs.

The virtual synchronous generator control is performed on the inverter, and the virtual synchronous generator control includes the droop control. The droop control includes an angular frequency reference value and a voltage amplitude reference value. When the parameter M is the voltage amplitude U, the disturbance signal is superimposed on the voltage amplitude reference value of the droop control, and when the parameter M is the angular frequency ω, the disturbance signal is superimposed on the angular frequency reference value of the droop control.

Figure 13:
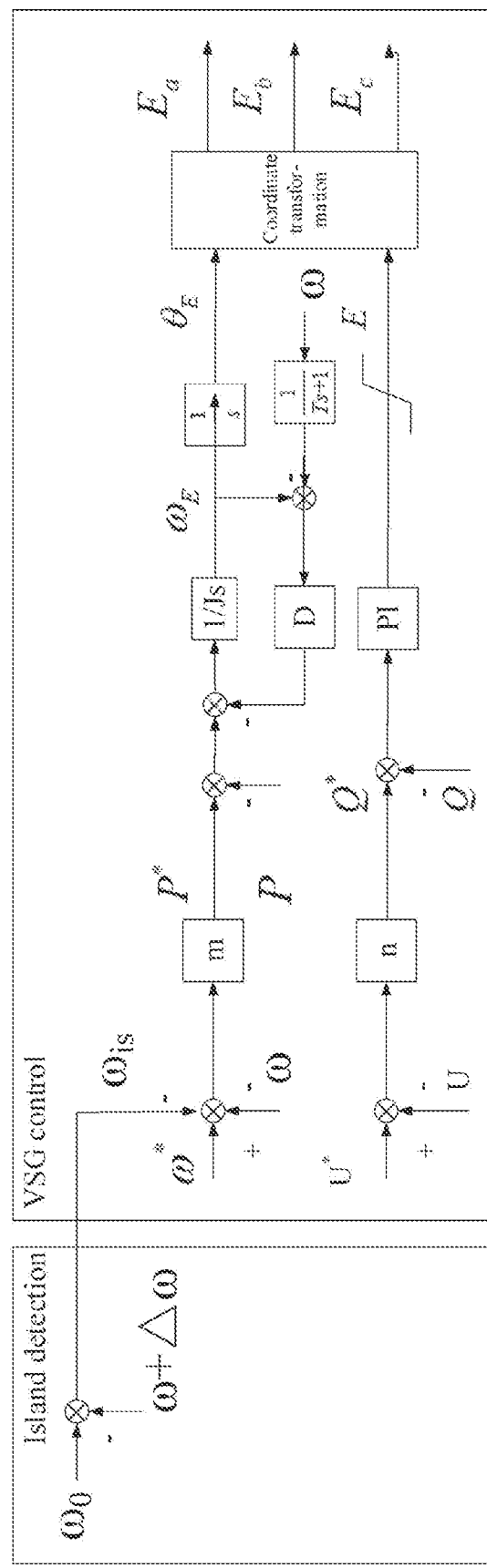
FIG. 13 schematically shows a block diagram of a first control unit and a fourth control unit according to an embodiment of the present disclosure.

FIG. 13 is a control block diagram corresponding to the first control unit and the fourth control unit. As shown in FIG. 13, the fourth control unit 209 obtains the angular frequency ω of the output voltage, and filters the angular frequency ω to obtain the steady-state value $\omega_0$ of the angular frequency, which can be understood as the average value of the angular frequency within the period of time. ω is compared with $\omega_0$. When they are not equal, ω is increased or decreased by an increment Δω to obtain ω', and the error between $\omega_0$ and ω' is reversed to obtain the disturbance signal, which is introduced into the angular frequency reference value of the droop control. If the island occurs, the disturbance superimposed on the angular frequency reference value of the droop control will cause the angular frequency of the output voltage to deviate from the rated value and reach the upper limit or the lower limit. As a result, the island is determined.

As shown in FIG. 13, the increment Δω can be positive or negative. When coo is greater than ω, the increment Δω is negative, then the error between $\omega_0$ and ω' is reversed to obtain the disturbance signal $\omega_{is}$, which is added to the angular frequency reference value ω*. Obviously the disturbance signal $\omega_{is}$ is negative at this time, so it is equivalent to superimposing the reverse disturbance of a small amplitude frequency on the angular frequency reference value of the droop control. When $\omega_0$ is less than ω, the increment Δω is positive, then the error between $\omega_0$ and ω' is reversed to obtain the disturbance signal $\omega_{is}$, which is superimposed on the angular frequency reference value ω*. Obviously, the disturbance signal $\omega_{is}$ is positive at this time, so it is equivalent to superimposing the positive disturbance of a small amplitude frequency on the angular frequency reference value of the droop control. The value of Δω is small. In an embodiment, Δω is ±0.01 Hz, but the present disclosure is not limited thereto. For example, $\omega_0$ is 50 HZ. When ω is 51 HZ, Δω is 0.01 Hz, ω' is 51.01 HZ, the error between $\omega_0$ and ω' is −1.01 HZ, and at this time the disturbance signal $\omega_{is}$ is 1.01 HZ. When ω is 49 HZ, Δω is −0.01 Hz, ω' is 48.99 HZ, the error between $\omega_0$ and ω' is 1.01 HZ, and the disturbance signal $\omega_{is}$ is −1.01 HZ at this time.

When $\omega_0$ is greater than ω, the disturbance signal $\omega_{is}$ is negative, and the negative disturbance of a small amplitude frequency is superimposed on the angular frequency reference value ω* of the droop control. During the grid-connected operation, since the output voltage $U_{abc}$ is clamped by the grid, the angular frequency ω thereof does not change or changes slightly. If the island occurs, the real-time angular frequency ω will gradually decrease due to the action of the negative feedback, and the absolute value of the disturbance frequency $\omega_{is}$ will gradually increase. The angular frequency reference value of the droop control added with the disturbance gradually decreases and the real-time angular frequency ω will eventually reach the lower limit, so it is determined that the island occurs.

When $\omega_0$ is less than ω, the disturbance signal $\omega_{is}$ is positive, and the positive disturbance of a small amplitude frequency is superimposed on the angular frequency reference value ω* of the droop control. During the grid-connected operation, since the output voltage $U_{abc}$ is clamped by the grid, the angular frequency ω thereof does not change or changes slightly. If the island occurs, the real-time angular frequency ω will gradually increase due to the action of the positive feedback, and the disturbance frequency $ω_{is}$ will gradually increase. The angular frequency reference value of the droop control added with the disturbance gradually increases and the real-time angular frequency ω will eventually reach the upper limit, so it is determined that the island occurs.

Figure 14:
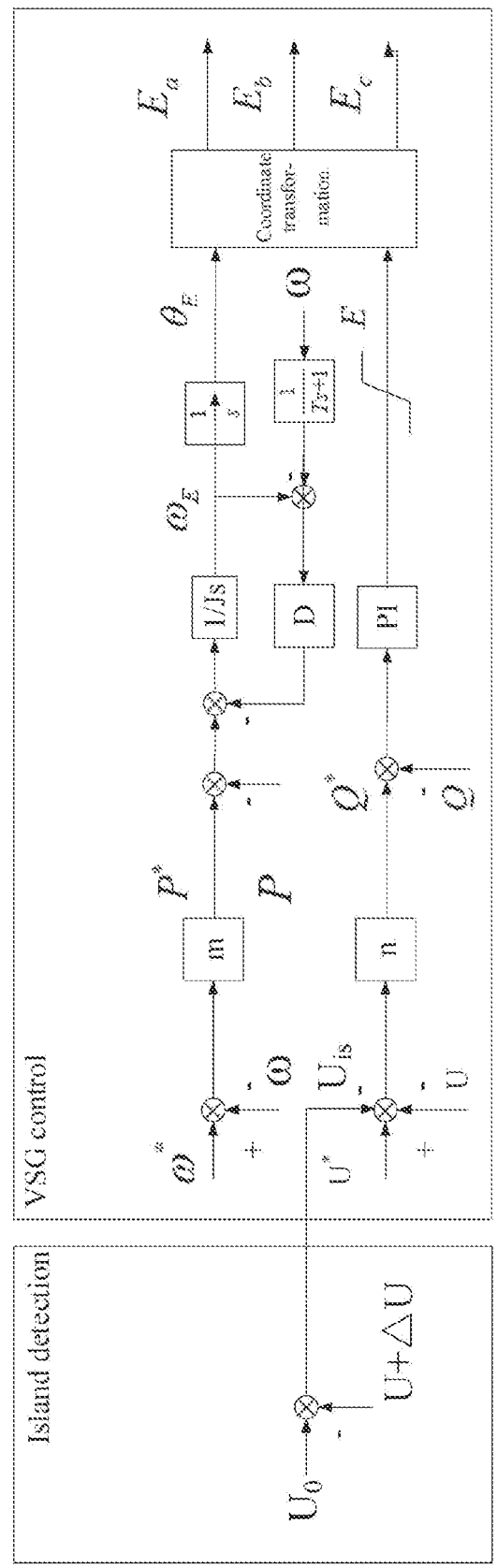
FIG. 14 schematically shows a block diagram of a first control unit and a fourth control unit according to another embodiment of the present disclosure.

FIG. 14 is another control block diagram corresponding to the first control unit and the fourth control unit. As shown in FIG. 14, the fourth control unit 209 obtains the voltage amplitude U of the output voltage of the inverter, and filters the voltage amplitude U to obtain the steady-state value $U_0$ of the voltage amplitude, which can be understood as an average value of the voltage amplitude within the period of time. U is compared with $U_0$. When they are not equal, U is increased or decreased by an increment ΔU to obtain U', the error between $U_0$ and U' is reversed to obtain a disturbance signal, and the disturbance signal is introduced into the voltage amplitude reference value of the droop control. If island occurs, the disturbance superimposed on the voltage amplitude reference value of the droop control will cause the output voltage to deviate from the rated value and reach the upper limit or the lower limit. As a result, the island is determined.

As shown in FIG. 14, the increment ΔU can be positive or negative. When $U_0$ is greater than U, the increment ΔU is negative, then the error between $U_0$ and U' is reversed to obtain the disturbance signal $U_{is}$, which is added to the voltage amplitude reference value U*. Obviously the disturbance signal $U_{is}$ is negative at this time, so it is equivalent to superimposing the reverse disturbance of a small amplitude voltage on the voltage amplitude reference value of the droop control. When $U_0$ is less than U, the increment ΔU is positive, then the error between $U_0$ and U' is reversed to obtain the disturbance signal $U_{is}$, which is superimposed on the voltage amplitude reference value U*. Obviously, the disturbance signal $U_{is}$ is positive at this time, so it is equivalent to superimposing the positive disturbance of a small amplitude voltage on the voltage amplitude reference value of the droop control. The value of ΔU is small. In an embodiment, ΔU is ±0.01 V, but the present disclosure is not limited thereto. For example, $U_0$ is 200V. When U is 201V, ΔU is 0.1V, U' is 201.1V, the error between $U_0$ and U' is −1.1V, and at this time the disturbance signal $U_{is}$ is 1.1V. When U is 199V, ΔU is −0.1V, U' is 198.9V, the error between $U_0$ and U' is 1.1V, and the disturbance signal $U_{is}$ is −1.1 V at this time.

When $U_0$ is greater than U, the disturbance signal $U_{is}$ is negative, and the negative disturbance of a small amplitude voltage is superimposed on the voltage amplitude reference value U* of the droop control. During the grid-connected operation, since the output voltage $U_{abc}$ is clamped by the grid, the voltage amplitude U thereof does not change or changes slightly. If the island occurs, the real-time voltage amplitude U will gradually decrease due to the action of the negative feedback, and the absolute value of the disturbance voltage $U_{is}$ will gradually increase. The voltage amplitude reference value of the droop control added with the disturbance gradually decreases and the real-time voltage amplitude U will eventually reach the lower limit, so it is determined that the island occurs.

When $U_0$ is less than U, the disturbance signal $U_{is}$ is positive, and the positive disturbance of a small amplitude voltage is superimposed on the voltage amplitude reference value U* of the droop control. During the grid-connected operation, since the output voltage $U_{abc}$ is clamped by the grid, the voltage amplitude U thereof does not change or changes slightly. If the island occurs, the real-tune voltage amplitude U will gradually increase due to the action of the positive feedback, and the disturbance voltage $U_{is}$ will gradually increase. The voltage amplitude reference value of the droop control added with the disturbance gradually increases and the real-time voltage amplitude U will eventually reach the upper limit, so it is determined that the island occurs.

The island detection method of the present disclosure is simple and the determination result is accurate. Superimpose the positive or negative disturbance signal on the voltage amplitude reference value or the angular frequency reference value of the droop control for the virtual synchronous generator, which make the voltage amplitude or the angular frequency being continuously disturbed positively or negatively in a small amplitude. Then the voltage amplitude or the angular frequency added with the disturbance is compared with the threshold. When the voltage amplitude or the angular frequency is greater than the upper limit or less than the lower limit, the island is detected. In the present disclosure, the island phenomenon can be quickly identified and the result is accurate. The disturbance signal is small, which does not affect the stable operation of the AC system. Furthermore, the disturbance signal is directly superimposed on the reference value of the droop control for the virtual synchronous generator, so the implement method is simple.

Figure 15:
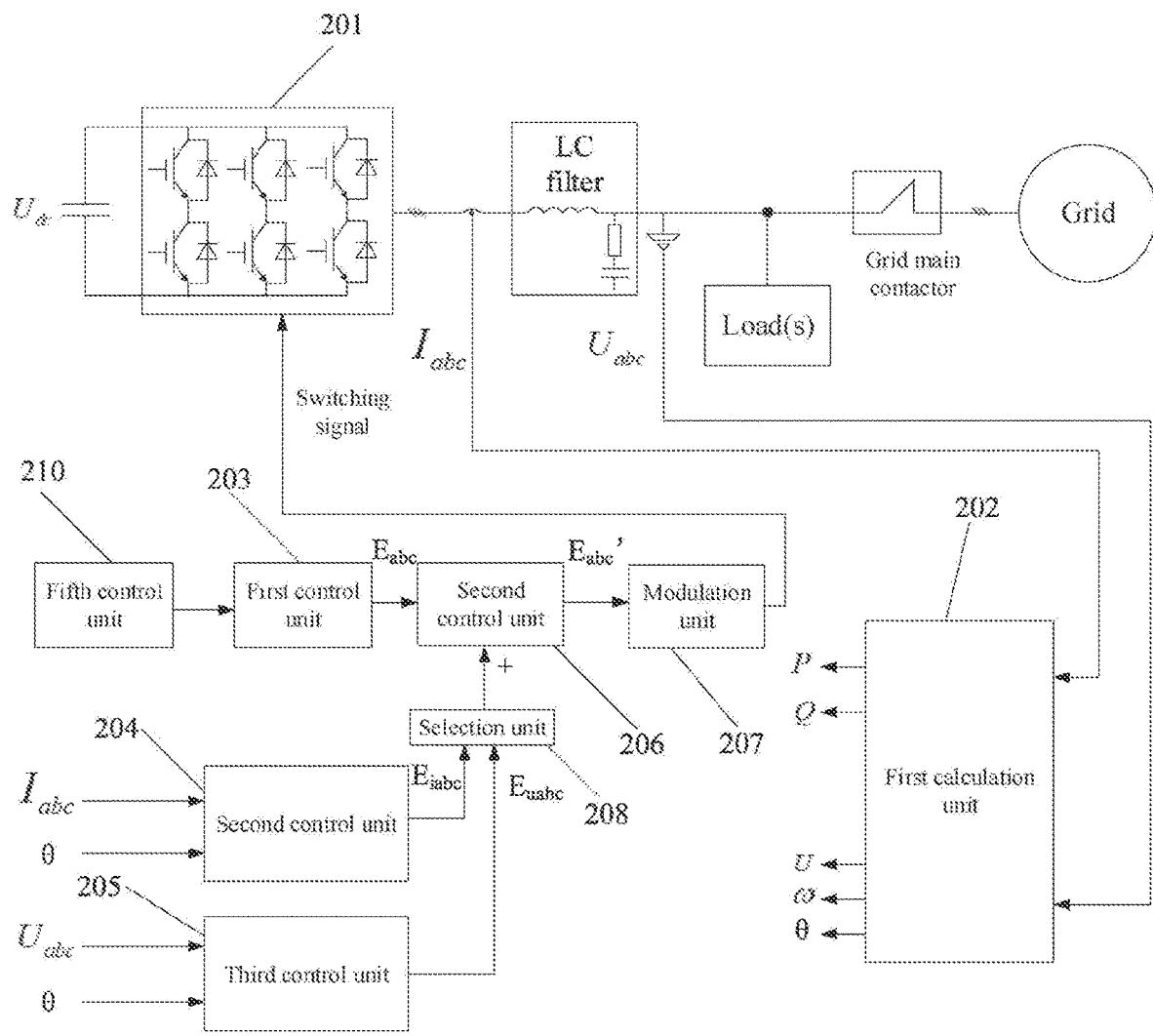
FIG. 15 schematically shows a schematic diagram of a three-phase AC system according to another embodiment of the present disclosure.

As shown in FIG. 15, the three-phase AC system may also include a fifth control unit 210, so that the virtual synchronous generator (VSG) of the three-phase AC system can have a secondary voltage and frequency regulation function when it is operated in off-grid mode. When the virtual synchronous generator is operated off-grid, the load will cause the frequency and amplitude of the output voltage to change, causing the output voltage amplitude and frequency to deviate from the rated value. By adding the closed-loop control of the secondary voltage regulation and secondary frequency regulation, the voltage amplitude and frequency can be regulated to the rated voltage amplitude and frequency.

Specifically, PI regulation is performed on the angular frequency ω of the output voltage according to the rated frequency to obtain a first reference value, and the first reference value is added to the angular frequency reference value ω* of the virtual synchronous generator to obtain a new angular frequency reference value. The PI regulation is performed on the output voltage amplitude U according to the rated value of the output voltage to obtain a second reference value, and the second reference value is added to the voltage amplitude reference value U* of the virtual synchronous generator to obtain a new voltage amplitude reference value.

Figure 16:
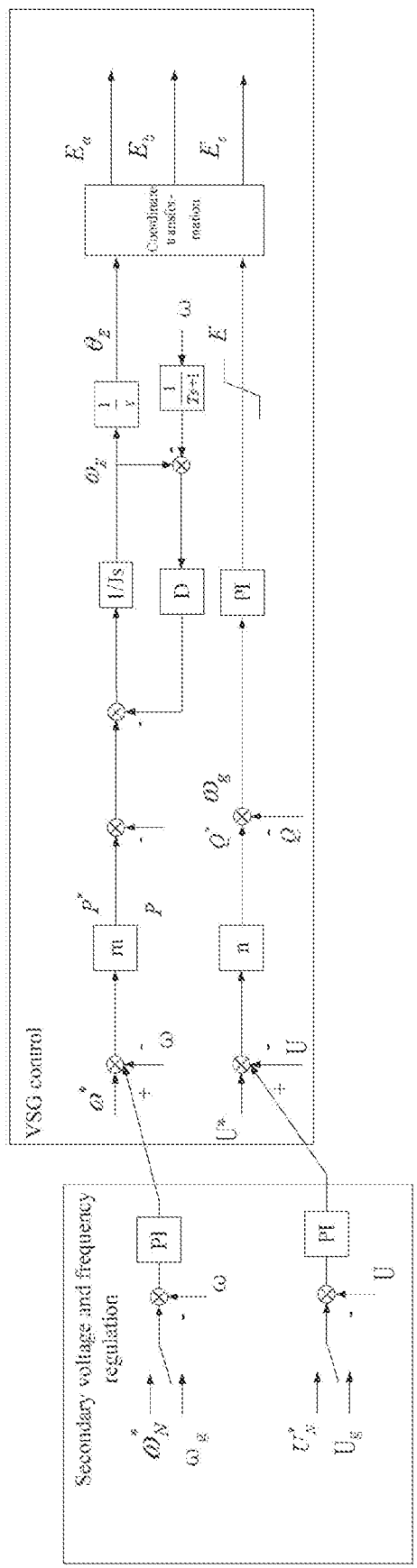
FIG. 16 schematically shows a block diagram of a first control unit and a fifth control unit according to an embodiment of the present disclosure.

As shown in FIG. 16, the reference value for the secondary voltage regulation is the rated voltage $U_N$*, and the output voltage amplitude U is used as feedback. With the PI regulation, the second reference value ΔU2* is output. The sum of the second reference value and the voltage amplitude reference value U* of the voltage droop control is used as a new droop control voltage amplitude reference value. With the closed-loop control, the voltage amplitude can be regulated to the rated voltage amplitude $U_N$*.

The secondary frequency regulation reference is the rated angular frequency $ω_N$*, and the angular frequency ω of the output voltage is used as feedback. With the PI regulation, the first reference value Δω2* is output. The sum of the first reference value and the angular frequency reference value ω* of the angular frequency droop control is used as a new droop control angular frequency reference value. With the closed-loop control, the angular frequency can be regulated to the rated angular frequency $\omega_N^*$.

In addition, when the front-end power grid is restored and the virtual synchronous generator needs to be automatically synchronized with the power grid to reconnect to the grid, the rated reference values of the secondary voltage and frequency regulation are the amplitude $U_g$ and angular frequency $\omega_g$ of the front-end power grid.

It should be noted that the three-phase AC system can also include both the fourth control unit 209 in FIG. 11 and the fifth control unit 210, that is, the island detection can be performed when it is grid-connected, and the secondary voltage and frequency regulation can be performed when it is off-grid.

In the control method of the three-phase AC system in the embodiments of the present disclosure, the harmonic component including the fundamental negative sequence component in the output signal of the three-phase AC system is extracted, and the harmonic component error signal is obtained according to the reference value of the harmonic component. Then the harmonic compensation electric potential is obtained. The harmonic compensation electric potential and the fundamental electric potential are added up and modulated to obtain a pulse signal, which can realize the performance of the virtual synchronous generator to slow down the change of the grid frequency and the harmonic control performance of the grid-connected and off grid operation at the same time. It can also have the functions of island detection and secondary voltage and frequency regulation.

Device embodiments of the present disclosure are described below, which can be used to perform the above control method of the three-phase AC system of the present disclosure.

Figure 17:
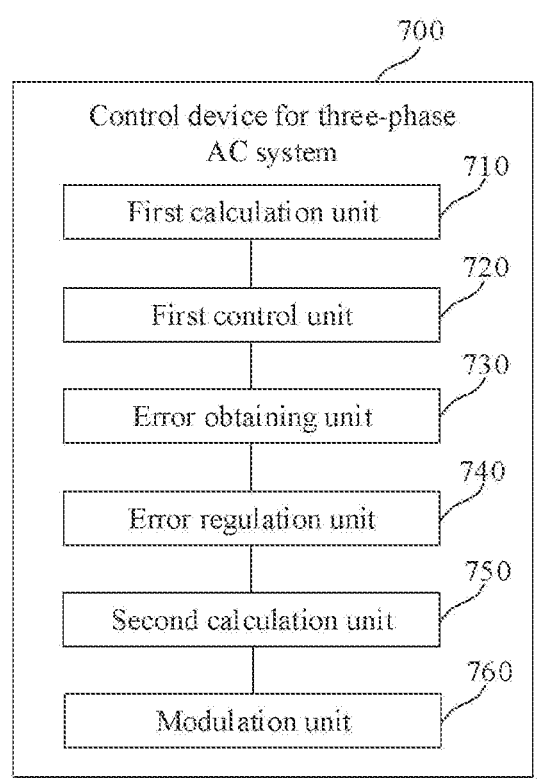
FIG. 17 schematically shows a block diagram of a control device of a three-phase AC system according to an embodiment of the present disclosure.

As shown in FIG. 17, an embodiment of the present disclosure provides a control device 700 for a three-phase AC system. The three-phase AC system includes an inverter and a filter unit. The inverter is coupled to the power grid and the load through the filter unit. Specifically, the control device includes:

a first calculation unit 710 configured to receive an output signal of the three-phase AC system, and obtain a characteristic value of the output signal according to the output signal;

a first control unit 720 configured to perform virtual synchronous generator control on the inverter to obtain a fundamental electric potential;

an error obtaining unit 730 configured to extract a harmonic component in the output signal and obtain an error signal according to the harmonic component and a reference value of the harmonic component;

an error regulation unit 740 configured to control the error signal to obtain a harmonic compensation electric potential:

a second calculation unit 750 configured to obtain a control electric potential by superimposing the harmonic compensation electric potential with the fundamental electric potential; and a modulation unit 760 configured to obtain a pulse signal by modulating the control electric potential, and to obtain a switching signal of the inverter according to the pulse signal.

In the technical solutions of the embodiments of the present disclosure, the closed-loop control of the harmonic component is performed by extracting the harmonic components of the output signal to obtain the harmonic compensation electric potential. The harmonic compensation electric potential and the fundamental wave electric potential are added up to obtain the control electric potential. The operation of the inverter is controlled according to the control electric potential, which can realize the inertia and damping characteristics of the virtual synchronous generator and suppress the harmonic components in the output signal of the three-phase AC system.

In an embodiment, the first calculation unit 710 correspond to the first calculation unit 202 shown in FIG. 2, and can be implemented as shown in FIG. 3.

The first control unit 720 correspond to the first control unit 203 shown in FIG. 2, and can be implemented by a controller, a processor or the like, or implemented in the form of hardware or a combination of hardware and computer software.

The error obtaining unit 730 and the error regulation unit 740 correspond to the regulation unit in FIG. 2, can be implemented by a controller, a processor or the like, or implemented in the form of hardware or a combination of hardware and computer software.

The second calculation unit 750 corresponds to the second calculation unit 206 shown in FIG. 2, which can be implemented by, for example, an adder.

The modulation unit 760 corresponds to the modulation unit 207 shown in FIG. 2, and can be implemented through a sinusoidal PWM (SPWM) technology or a space vector PWM (SVPWM) technology.

When the three-phase AC system operates in the grid-connected mode, the second control unit is switched on to control the harmonic current of the output current, and the third control unit is shielded. To implement the steps in FIG. 5a, the error obtaining unit includes the following modules.

A harmonic current obtaining module is configured to perform 3s/2r coordinate transformation on the output current of the inverter to obtain a current signal, perform low-pass filtering on the current signal to obtain a fundamental current, and subtract the fundamental current from the current signal to obtain a harmonic current. In some embodiments, it includes a coordinate transformer, a filter, and a subtractor. The coordinate transformer performs the 3s/2r coordinate transformation according to the angle signal θ, or performs the 3s/2s coordinate transformation first and then performs the 2s/2r coordinate transformation, where the current signal includes a d-axis current signal $I_d$ and a q-axis current signal $I_q$.

A current reference value setting module is configured to set a harmonic current reference value to zero to obtain an error signal. In some embodiments, it includes a subtractor to subtract the harmonic current from zero.

The error regulation unit 740 may include the following modules.

A first coordinate transformation module is configured to perform coordinate transformation of multiple coordinate systems on the error signal to obtain the error signal in each of the coordinate systems. In some embodiments, it includes multiple coordinate transformers.

A harmonic control module is configured to perform closed-loop control on the error signal in each coordinate system to obtain electric potential instructions corresponding to the multiple coordinate systems. In some embodiments, it includes multiple current regulators.

A second coordinate transformation module is configured to perform coordinate transformation on the electric potential instructions to obtain multiple harmonic electric potentials in a two-phase stationary coordinate system. In some embodiments, it includes multiple coordinate transformers.

A first calculation module is configured to add up the multiple harmonic electric potentials in the two-phase stationary coordinate system and perform a two-phase stationary/three-phase stationary coordinate transformation to obtain the harmonic compensation electric potential.

In another embodiment, in order to implement the above steps in FIG. 6, the error obtaining unit includes the following modules: a harmonic current obtaining module and a current reference value setting module. The structure and function of the harmonic current obtaining module are similar to those of the harmonic current obtaining module in the above embodiment. The current reference value setting module is configured to perform coordinate transformation of multiple coordinate systems on the harmonic current to obtain the harmonic currents corresponding to the multiple coordinate systems, and set a reference value of the harmonic current in each coordinate system to zero to obtain an error signal in each of the coordinate systems. In some embodiments, it includes multiple coordinate transformers and multiple subtractors. Reference can be made to the description of FIG. 6 for details, which will not be repeated here.

The error regulation unit 740 may include:
a harmonic control module configured to perform closed-loop control on the error signal in each coordinate system to obtain the electric potential instructions corresponding to the multiple coordinate systems;
a third coordinate transformation module configured to perform coordinate transformation on the electric potential instructions to obtain multiple harmonic electric potentials in the two-phase stationary coordinate system; and
a second calculation module configured to add up the multiple harmonic electric potentials in the two-phase stationary coordinate system and perform a two-phase stationary/three-phase stationary coordinate transformation to obtain the harmonic compensation electric potential.

In this embodiment, in order to implement the steps in FIG. 7a, the error regulation unit 740 may further include:
a fourth coordinate transformation module configured to perform coordinate transformation on the error signal to obtain the error signal in the two-phase stationary coordinate system;
multiple control modules respectively configured to perform closed-loop control on the error signal in the two-phase stationary coordinate system to obtain multiple harmonic electric potentials in the two-phase stationary coordinate system; and
a third calculation module configured to add up the multiple harmonic electric potentials in the two-phase stationary coordinate system and perform a two-phase stationary/three-phase stationary coordinate transformation to obtain the harmonic compensation electric potential.

The multiple control modules include a PR control module and two R control modules. The PR control module outputs a negative sequence electric potential, and the two R control modules output a 5th-order harmonic electric potential and a 7th-order harmonic electric potential, respectively.

When the three-phase AC system is operating in the off-grid mode, the third control unit is switched on to control the harmonic voltage of the output voltage, and the second control unit is shielded.

To implement the steps in FIG. 8a, the error obtaining unit can include:
a harmonic voltage obtaining module configured to perform coordinate transformation on the output voltage of the three-phase AC system to obtain a voltage signal, perform low-pass filtering on the voltage signal to obtain a fundamental voltage, and subtract the fundamental voltage from the voltage signal to obtain a harmonic voltage. In some embodiments, it includes a coordinate transformer, a filter, and a subtractor. The coordinate transformer performs a 3s/2r coordinate transformation according to the angle signal θ, or performs a 3s/2s coordinate transformation first and then performs a 2s/2r coordinate transformation, where the voltage signal include a d-axis voltage signal $U_d$ and a q-axis voltage signal $U_q$; and
a voltage reference value setting module configured to set a reference value of the harmonic voltage to zero to obtain the error signal.

In this embodiment, the error regulation unit 740 may further include:
a first coordinate transformation module configured to perform coordinate transformation of multiple coordinate systems on the error signal to obtain the error signal in each coordinate system;
a harmonic control module configured to perform closed-loop control on the error signal in each coordinate system to obtain electric potential instructions corresponding to the multiple coordinate systems. In some embodiments, it includes multiple voltage regulators;
a second coordinate transformation module configured to perform coordinate transformation on the electric potential instructions to obtain multiple harmonic electric potentials in the two-phase stationary coordinate system; and
a first calculation module configured to add up the multiple harmonic electric potentials in the two-phase stationary coordinate system and perform a two-phase stationary/three-phase stationary coordinate transformation to obtain the harmonic compensation electric potential.

To implement the steps in FIG. 9a, the error obtaining unit can include:
a harmonic voltage obtaining module configured to perform coordinate transformation on the output voltage of the three-phase AC system to obtain a voltage signal, perform low-pass filtering on the voltage signal to obtain a fundamental voltage, and subtract the fundamental voltage from the voltage signal to obtain a harmonic voltage; and
a voltage reference value setting module configured to perform coordinate transformation of multiple coordinate systems on the harmonic voltage to obtain the harmonic voltages corresponding to the multiple coordinate systems, and set a reference value of the harmonic voltage in each of the coordinate systems to zero to obtain the error signal in each of the coordinate systems.

The error regulation unit 740 may include:
a harmonic control module configured to perform closed-loop control in each coordinate system to obtain the electric potential instructions corresponding to the multiple coordinate systems;
a third coordinate transformation module configured to perform coordinate transformation on the electric potential instructions to obtain multiple harmonic electric potentials in the two-phase stationary coordinate system; and
a second calculation module configured to add up the multiple harmonic electric potentials in the two-phase stationary coordinate system and perform a two-phase stationary/three-phase stationary coordinate transformation to obtain the harmonic compensation electric potential.

To implement the steps corresponding to the control structure in FIG. 10, the error regulation unit 740 may further include:

a fourth coordinate transformation module configured to perform coordinate transformation on the error signal to obtain the error signal in the two-phase stationary coordinate system;

multiple control modules respectively configured to perform closed-loop control on the error signal in the two-phase stationary coordinate system to obtain multiple harmonic electric potentials in the two-phase stationary coordinate system; and a third calculation module configured to add up the multiple harmonic electric potentials in the two-phase stationary coordinate system and perform a two-phase stationary/three-phase stationary coordinate transformation to obtain the harmonic compensation electric potential.

The multiple control modules include a PR control module and two R control modules. The PR control module outputs a negative sequence electric potential, and the two R control modules output a 5th-order harmonic electric potential and a 7th-order harmonic electric potential, respectively.

For details, please refer to the above description, which will not be repeated here for the sake of brevity.

The control device of the three-phase AC system of the present disclosure extracts the harmonic component in the output signal of the three-phase AC system, performs closed-loop control on the harmonic component to obtain the harmonic compensation electric potential, superimposes the harmonic compensation electric potential on the fundamental electric potential output by the virtual synchronous generator control to obtain the control electric potential, and modulates the control electric potential to obtain the switching signal of the inverter, which realizes virtual synchronous generator control while suppressing the harmonic components in the output signal of the three-phase AC system.

Figure 18:
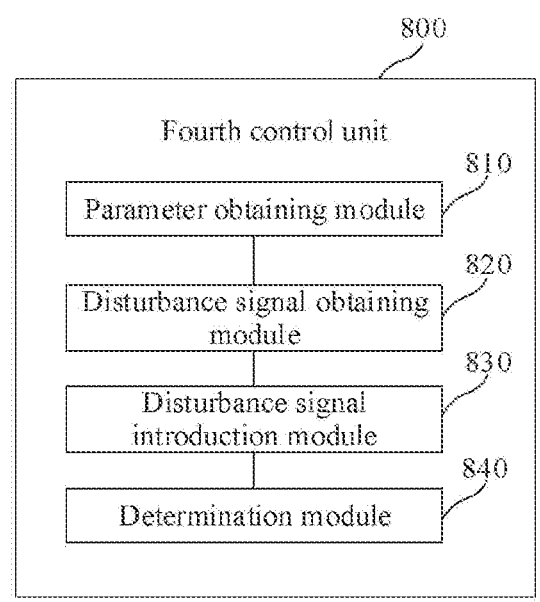
FIG. 18 schematically shows a block diagram of a fourth control unit according to an embodiment of the present disclosure.

The three-phase AC system of the present disclosure also has an island detection function for determining whether the three-phase AC system is operating in a grid-connected mode or in an off-grid mode, and the corresponding control device also includes a fourth control unit for island detection. To implement the island detection method of the present disclosure, such as the method in FIGS. 12-14, referring to FIG. 18, the fourth control unit 800 includes a parameter obtaining module 810, a disturbance signal obtaining module 820, a disturbance signal introduction module 830, and a determination module 840.

The parameter obtaining module 810 is configured to obtain a parameter M of the output voltage $U_{abc}$ of the three-phase AC system and a corresponding steady-state value $M_0$ thereof within a period of time. For example, it is coupled to the first calculation unit to receive the amplitude U or the angular frequency $\omega$ of the output voltage $U_{abc}$, and obtains the steady-state value $U_0$ or $\omega_0$ of the parameter through a filter. The disturbance signal obtaining module 820 obtains a disturbance signal according to the parameter M and the steady state value $M_0$. Specifically, the steady-state value and the parameter are compared, and when they are not equal, a new parameter M' is obtained by superimposing the parameter M with an increment $\delta$, and the error between the steady-state value and the new parameter is reversed to obtain the disturbance signal. The disturbance signal introduction module 830 is configured to superimpose the disturbance signal on the reference value of the droop control. Specifically, when the parameter M is the voltage amplitude, the disturbance signal is superimposed on the voltage amplitude reference value of the droop control; and when the parameter is the angular frequency, the disturbance signal is superimposed on the angular frequency reference value of the droop control. The determination module 840 detects the parameter added with the disturbance signal in real time and compares it with a threshold. When the parameter exceeds the threshold, it is determined that the island occurs. For example, when the disturbance signal is added to the angular frequency reference value $\omega^*$, the angular frequency $\omega$ of the output voltage is detected in real time and compared with the threshold; and when the disturbance signal is added to the voltage amplitude reference value $U^*$, the amplitude U of the output voltage is detected in real time and is compared with the threshold.

In some embodiments, there is provided an electronic device. The electronic device may include a processor and a memory for storing instructions executable by the processor. The processor is configured to: obtain a parameter of an output voltage of a three-phase alternating current (AC) system and a steady-state value corresponding to the parameter within a period of time; obtain an disturbance signal based on the parameter and the steady-state value; superimpose the disturbance signal on at least one reference value of a droop control; and detect the parameter added with the disturbance signal, and determine that island occurs in response to the parameter greater than an upper limit or less than a lower limit.

In some embodiments, there is provided a computer-readable storage medium having a computer program stored thereon. When the computer program is executed, steps in an islanding detection method for an inverter are performed. The method may include step A1: obtaining a parameter of an output voltage of a three-phase alternating current (AC) system and a steady-state value corresponding to the parameter within a period of time; step A2: obtaining an disturbance signal based on the parameter and the steady-state value; step A3: superimposing the disturbance signal on at least one reference value of a droop control; and step A4: detecting the parameter added with the disturbance signal, and determining that island occurs in response to the parameter greater than an upper limit or less than a lower limit.

In order to realize the island detection method of the present disclosure, the disturbance signal obtaining module 820 further includes: a comparison sub-module configured to compare the steady-state value and the parameter; a superposition sub-module configured to obtain a new parameter by superimposing an increment with the parameter when the steady-state value and the parameter are not equal; a calculation sub-module configured to obtain an error between the steady-state value and the new parameter, and reverse the error to obtain the disturbance signal.

Since the functional modules of the control device of the three-phase AC system according to the exemplary embodiments of the present disclosure correspond to the steps of the exemplary embodiments of the control method of the three-phase AC system as described above, details that are not disclosed in the device embodiments of the present disclosure, reference can be made to the embodiments of the above control methods of the three-phase AC system of the present disclosure.

It should be noted that when the control device provided in the above embodiments realize the functions thereof, the division of the above-mentioned functional modules is used only as an example for illustration, and in actual applications, the above-mentioned functions can be allocated to be performed by different functional modules according to actual needs. That is, the content structure of the device is divided into different functional modules to complete all or part of the functions described above.

It should also be noted that the control device includes a hardware structure and/or software module corresponding to each of the functions, and can be implemented in the form of hardware or a combination of hardware and computer software. For example, the functional modules can be implemented by hardware integrated logic circuits in a processor or instructions in the form of software. Whether a certain function module is implemented by hardware or computer software-driven hardware depends on the specific applications of the technical solution and design constraint conditions. Those skilled in the art can use different methods for each specific application to implement the described functions, and such implementation should not be considered as going beyond the scope of the technical solutions of the embodiments of the present disclosure.

The above control device of the three-phase AC system with VSG function can be a computer solution based on the method flow of the present disclosure, that is, a software architecture, which can be applied to the control system of the VSG, and the above device is a process corresponding to the method flow.

Those skilled in the art will easily think of other embodiments of the present disclosure after considering the description and practicing the disclosure disclosed herein. The present application is intended to cover any variations, uses, or adaptive changes of the present disclosure which follow the general principles of the present disclosure and include common knowledge or conventional technical means in the art that are not disclosed in the present disclosure. The description and the embodiments are considered as exemplary only, and a true scope and spirit of the present disclosure are defined by the appended claims.

It should be understood that the present disclosure is not limited to the precise structures that have been described above and shown in the drawings, and various modifications and changes can be made without departing from the scope thereof. The scope of the present disclosure is defined only by the appended claims.

What is claimed is:

1. An islanding detection method for an inverter in a three-phase alternating current (AC) system, the method being performed by a controller in the three-phase AC system and comprising:
    a step A1: obtaining, by the controller, a parameter of an output voltage of a three-phase alternating current (AC) system and a steady-state value corresponding to the parameter within a period of time;
    a step A2: obtaining, by the controller, a disturbance signal based on the parameter and the steady-state value;
    a step A3: superimposing, by the controller, the disturbance signal on at least one reference value of a droop control of the inverter; and
    a step A4: detecting, by the controller, the parameter after superimposing the disturbance signal on the at least one reference value, and determining, by the controller, that island occurs in the inverter in response to the parameter being greater than an upper limit or less than a lower limit,
    wherein the step A2 comprises:
    a step A21: comparing the steady-state value with the parameter;
    a step A22: obtaining a new parameter by superimposing an increment to the parameter when the steady-state value is not equal to the parameter; and
    a step A23: calculating an error between the steady-state value and the new parameter, and obtaining the disturbance signal by reversing the error.

2. The method according to claim 1, further comprising:
    when the steady-state value is greater than the parameter, superimposing, by the controller, a reverse disturbance on the at least one reference value of the droop control; and
    when the parameter after superimposing the reverse disturbance on the at least one reference value is less than the lower limit, determining, by the controller, that the island occurs.

3. The method according to claim 1, further comprising:
    when the steady-state value is less than the parameter, superimposing, by the controller, a forward disturbance on the at least one reference value of the droop control; and
    when the parameter after superimposing the forward disturbance on the at least one reference value is greater than the upper limit, determining, by the controller, that the island occurs.

4. The method according to claim 1, before the step A1, further comprising:
    obtaining, by the controller, the parameter by phase-locking the output voltage of the three-phase AC system; and
    obtaining, by the controller, the steady-state value by filtering the parameter for the period of time.

5. The method according to claim 1, further comprising: performing, by the controller, a virtual synchronous generator control on the inverter, wherein the virtual synchronous generator control comprises the droop control;
    when the parameter is a voltage amplitude, superimposing, by the controller, the disturbance signal on a voltage amplitude reference value of the droop control; and when the parameter is an angular frequency, superimposing, by the controller, the disturbance signal on an angular frequency reference value of the droop control.

6. The method according to claim 5, wherein, when the parameter is the voltage amplitude, the step A4 comprises:
    detecting, by the controller, the voltage amplitude after superimposing the disturbance signal on the at least one reference value, and determining, by the controller, that the island occurs in response to the voltage amplitude being greater than the upper limit or less than the lower limit.

7. The method according to claim 5, wherein, when the parameter is the angular frequency, the step A4 comprises:
    detecting, by the controller, the angular frequency after superimposing the disturbance signal on the at least one reference value, and determining, by the controller, that the island occurs in response to the angular frequency being greater than the upper limit or less than the lower limit.

8. An electronic device, comprising:
    a processor; and
    a memory for storing instructions executable by the processor;
    wherein the processor is configured to:
    obtain a parameter of an output voltage of a three-phase alternating current (AC) system and a steady-state value corresponding to the parameter within a period of time;
    obtain a disturbance signal based on the parameter and the steady-state value;
    superimpose the disturbance signal on at least one reference value of a droop control; and
    detect the parameter after superimposing the disturbance signal on the at least one reference value, and determine that island occurs in response to the parameter being greater than an upper limit or less than a lower limit, wherein the processor is further configured to:
compare the steady-state value with the parameter;
obtain a new parameter by superimposing an increment to the parameter when the steady-state value is not equal to the parameter; and
calculate an error between the steady-state value and the new parameter, and obtain the disturbance signal by reversing the error.

9. The electronic device according to claim 8, wherein the processor is configured to:
superimpose a reverse disturbance on the at least one reference value of the droop control, when the steady-state value is greater than the parameter; and
determine that the island occurs, when the parameter after superimposing the reverse disturbance on the at least one reference value is less than the lower limit.

10. The electronic device according to claim 8, wherein the processor is configured to:
superimpose a forward disturbance on the at least one reference value of the droop control, when the steady-state value is less than the parameter; and
determine that the island occurs, when the parameter after superimposing the forward disturbance on the at least one reference value is greater than the upper limit.

11. The electronic device according to claim 8, wherein the processor is further configured to:
obtain the parameter by phase-locking the output voltage of the three-phase AC system; and
obtain the steady-state value by filtering the parameter for the period of time.

12. The electronic device according to claim 8, wherein the processor is further configured to:
perform a virtual synchronous generator control on the inverter,
wherein the virtual synchronous generator control comprises the droop control;
wherein when the parameter is a voltage amplitude, superimpose the disturbance signal on a voltage amplitude reference value of the droop control; and when the parameter is an angular frequency, superimpose the disturbance signal on an angular frequency reference value of the droop control.

13. The electronic device according to claim 12, wherein, when the parameter is the voltage amplitude, the processor is configured to:
detect the voltage amplitude after superimposing the disturbance signal on the at least one reference value, and determine that the island occurs in response to the voltage amplitude being greater than the upper limit or less than the lower limit.

14. The electronic device according to claim 12, wherein, when the parameter is the angular frequency, the processor is configured to:
detect the angular frequency after superimposing the disturbance signal on the at least one reference value, and determine that the island occurs in response to the angular frequency being greater than the upper limit or less than the lower limit.

15. A non-transitory computer-readable storage medium having a computer program stored thereon, wherein the computer program, when being executed on a computer, causes the computer to perform operations for detecting islanding in an inverter, the operations comprising:
obtaining a parameter of an output voltage of a three-phase alternating current (AC) system and a steady-state value corresponding to the parameter within a period of time;
obtaining a disturbance signal based on the parameter and the steady-state value;
superimposing the disturbance signal on at least one reference value of a droop control; and
detecting the parameter after superimposing the disturbance signal on the at least one reference value, and determining that island occurs in response to the parameter greater than an upper limit or less than a lower limit,
wherein said obtaining the disturbance signal based on the parameter and the steady-state value comprises:
comparing the steady-state value with the parameter;
obtaining a new parameter by superimposing an increment to the parameter when the steady-state value is not equal to the parameter; and
calculating an error between the steady-state value and the new parameter, and obtaining the disturbance signal by reversing the error.

* * * * *